(12) United States Patent
Son

(10) Patent No.: US 12,494,244 B2
(45) Date of Patent: Dec. 9, 2025

(54) MEMORY DEVICE AND REFRESH METHOD THEREOF

(71) Applicant: SAMSUNG ELECTRONICS CO., LTD., Suwon-si (KR)

(72) Inventor: Jongpil Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 18/076,932

(22) Filed: Dec. 7, 2022

(65) Prior Publication Data

US 2024/0029777 A1 Jan. 25, 2024

(30) Foreign Application Priority Data

Jul. 22, 2022 (KR) .................. 10-2022-0091096

(51) Int. Cl.
*G11C 11/406* (2006.01)
*G11C 11/4093* (2006.01)

(52) U.S. Cl.
CPC .. *G11C 11/40615* (2013.01); *G11C 11/40618* (2013.01); *G11C 11/4093* (2013.01)

(58) Field of Classification Search
CPC ........ G11C 11/40615; G11C 11/40618; G11C 11/4093; G11C 2211/4067; G11C 11/4063; G11C 11/40611; G11C 11/4087; G06F 3/0659
See application file for complete search history.

(56) References Cited

U.S. PATENT DOCUMENTS

| | | | |
|---|---|---|---|
| 8,392,650 B2 | 3/2013 | Bains | |
| 9,460,773 B2 | 10/2016 | Bains | |
| 9,824,742 B1 | 11/2017 | Saifuddin et al. | |
| 10,115,448 B2 | 10/2018 | Lee et al. | |
| 10,943,638 B2 | 3/2021 | Hong | |
| 2011/0299352 A1* | 12/2011 | Fujishiro | G11C 11/406 365/222 |
| 2013/0272082 A1* | 10/2013 | Kim | G11C 11/402 365/222 |
| 2014/0289461 A1 | 9/2014 | Fujisawa | |
| 2017/0140810 A1* | 5/2017 | Choi | G11C 11/40618 |
| 2019/0228813 A1* | 7/2019 | Nale | G06F 3/0619 |
| 2020/0058346 A1* | 2/2020 | Ito | G11C 11/4087 |
| 2021/0225425 A1 | 7/2021 | Do et al. | |
| 2022/0059153 A1* | 2/2022 | Zhang | G11C 11/406 |

\* cited by examiner

*Primary Examiner* — Uyen Smet
(74) *Attorney, Agent, or Firm* — Sughrue Mion, PLLC

(57) ABSTRACT

A memory device is provided. The memory device includes: a first memory cell array including a first row and a second row; and a self-refresh circuit configured to control refresh in response to a first self-refresh entry signal, and stop refresh of the second row after refreshing the first row in response to a self-refresh exit signal.

19 Claims, 20 Drawing Sheets

FIG. 5

|  | 351 | | 352 | | | | | | | |
|---|---|---|---|---|---|---|---|---|---|---|
|  | RA10 | RA9 | RA8 | RA7 | RA6 | RA5 | RA4 | RA3 | RA2 | RA1 |
| self refresh #1 | 0 | 0 | 0 | 0 | 0 | 0 | 0 | 0 | 0 | 0 |
|  | 1 | 0 | 0 | 0 | 0 | 0 | 0 | 0 | 0 | 0 |
|  | 0 | 1 | 0 | 0 | 0 | 0 | 0 | 0 | 0 | 0 |
|  | 1 | 1 | 0 | 0 | 0 | 0 | 0 | 0 | 0 | 0 |
| self refresh #2 | 0 | 0 | 1 | 0 | 0 | 0 | 0 | 0 | 0 | 0 |
|  | 1 | 0 | 1 | 0 | 0 | 0 | 0 | 0 | 0 | 0 |
|  | 0 | 1 | 1 | 0 | 0 | 0 | 0 | 0 | 0 | 0 |
|  | 1 | 1 | 1 | 0 | 0 | 0 | 0 | 0 | 0 | 0 |
| self refresh #3 | 0 | 0 | 0 | 1 | 0 | 0 | 0 | 0 | 0 | 0 |
|  | 1 | 0 | 0 | 1 | 0 | 0 | 0 | 0 | 0 | 0 |
|  | 0 | 1 | 0 | 1 | 0 | 0 | 0 | 0 | 0 | 0 |
|  | 1 | 1 | 0 | 1 | 0 | 0 | 0 | 0 | 0 | 0 |
| self refresh #4 | 0 | 0 | 1 | 1 | 0 | 0 | 0 | 0 | 0 | 0 |
|  | 1 | 0 | 1 | 1 | 0 | 0 | 0 | 0 | 0 | 0 |
|  | 0 | 1 | 1 | 1 | 0 | 0 | 0 | 0 | 0 | 0 |
|  | 1 | 1 | 1 | 1 | 0 | 0 | 0 | 0 | 0 | 0 |

FIG. 7

| | RA10 | RA9 | RA8 | RA7 | RA6 | RA5 | RA4 | RA3 | RA2 | RA1 |
|---|---|---|---|---|---|---|---|---|---|---|
| #1 | 0 | 0 | 0 | 0 | 0 | 0 | 0 | 0 | 0 | 0 |
| #2 | 1 | 0 | 0 | 0 | 0 | 0 | 0 | 0 | 0 | 0 |
| #3 | 0 | 1 | 0 | 0 | 0 | 0 | 0 | 0 | 0 | 0 |
| #4 | 1 | 1 | 0 | 0 | 0 | 0 | 0 | 0 | 0 | 0 |
| #5 | 0 | 0 | 1 | 0 | 0 | 0 | 0 | 0 | 0 | 0 |
| #6 | 1 | 0 | 1 | 0 | 0 | 0 | 0 | 0 | 0 | 0 |
| #7 | 0 | 1 | 1 | 0 | 0 | 0 | 0 | 0 | 0 | 0 |
| #8 | 1 | 1 | 1 | 0 | 0 | 0 | 0 | 0 | 0 | 0 |
| #9 | 0 | 0 | 0 | 1 | 0 | 0 | 0 | 0 | 0 | 0 |
| #10 | 1 | 0 | 0 | 1 | 0 | 0 | 0 | 0 | 0 | 0 |
| #11 | 0 | 1 | 0 | 1 | 0 | 0 | 0 | 0 | 0 | 0 |
| #12 | 1 | 1 | 0 | 1 | 0 | 0 | 0 | 0 | 0 | 0 |
| #13 | 0 | 0 | 1 | 1 | 0 | 0 | 0 | 0 | 0 | 0 |
| #14 | 1 | 0 | 1 | 1 | 0 | 0 | 0 | 0 | 0 | 0 |
| #15 | 0 | 1 | 1 | 1 | 0 | 0 | 0 | 0 | 0 | 0 |
| #16 | 1 | 1 | 1 | 1 | 0 | 0 | 0 | 0 | 0 | 0 |

| Wordline | Access Count |
|---|---|
| 462 | 500 |
| 3 | 448 |
| 9 | 411 |
| 50 | 357 |
| 1032 | 271 |
| ... | ... |

MEMORY DEVICE AND REFRESH METHOD THEREOF

CROSS-REFERENCE TO RELATED APPLICATION

This application claims priority to Korean Patent Application No. 10-2022-0091096, filed on Jul. 22, 2022, in the Korean Intellectual Property Office, the disclosure of which is incorporated by reference herein in its entirety.

BACKGROUND

1. Field

The present disclosure relates to a memory device and a refresh method thereof.

2. Description of Related Art

A volatile memory device, such as a dynamic random access memory (DRAM), uses a refresh operation to maintain stored data. To this end, a memory controller periodically may provide a refresh command to the memory device in a normal access mode to refresh the memory device, and in a self-refresh period in which power consumption is low, the memory device may be internally refreshed.

SUMMARY

One or more embodiments provide a memory device in which power consumption is reduced by shortening time from exit self-refresh to valid commands.

According to an aspect of an example embodiment, a memory device includes: a first memory cell array including a plurality of rows, the plurality of rows including a first row and a second row; and a self-refresh circuit configured to control refresh in response to a first self-refresh entry signal, and stop refresh of the second row after refreshing the first row in response to a self-refresh exit signal.

According to an aspect of an example embodiment, a memory device includes: a command decode circuit configured to decode a command, and output a self-refresh entry signal and a self-refresh exit signal; a self-refresh circuit configured to output a self-refresh control signal and a refresh row address in response to the self-refresh entry signal, and stop output of the self-refresh control signal and the refresh row address in response to the self-refresh exit signal; and a row address multiplexer configured to output the refresh row address in response to a high level of the self-refresh control signal, and output an operation row address in response to a low level of the self-refresh control signal. The refresh row address indicates a row to be refreshed, and the operation row address indicates a row to be written to, read from, or erased.

According to an aspect of an example embodiment, a refresh method of a memory device that includes a memory cell array including a plurality of rows, the plurality of rows including a first row and a second row, is provided. The refresh method includes: receiving a self-refresh entry signal; outputting a refresh row address corresponding to the first row in response to the self-refresh entry signal; receiving a self-refresh exit signal; and refreshing up to the first row at a time point of receipt of the self-refresh exit signal among the plurality of rows and stopping refresh of the second row after refreshing the first row.

BRIEF DESCRIPTION OF DRAWINGS

The above and other aspects and features will be more apparent from the following description of embodiments with reference to the attached drawings, in which:

FIG. 5 illustrates an example of a refresh row address generated by the refresh counter of FIG. 4.

FIG. 7 illustrates an example of a refresh row address generated by the refresh counter of FIG. 6.

FIG. 16 illustrates a word line table managed by a self-refresh circuit according to an embodiment.

DETAILED DESCRIPTION

Figure 1:
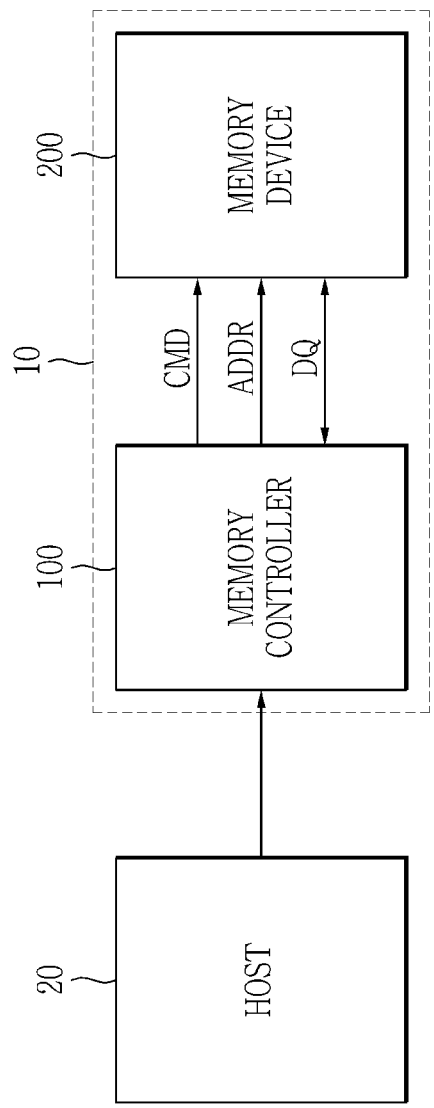
FIG. 1 illustrates a schematic block diagram of a memory system according to an embodiment.

Embodiments will now be described with reference to the accompanying drawings. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure.

Accordingly, the drawings and description are to be regarded as illustrative in nature and not restrictive. Like reference numerals indicate like elements throughout the specification. The term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

FIG. 1 illustrates a schematic block diagram of a memory system according to an embodiment.

Referring to FIG. 1, a memory system 10 may include a memory controller 100 and a memory device 200.

The memory controller 100 may control an overall operation of the memory system 10. The memory controller 100 may write data (DQ) to or read data (DQ) from the memory device 200 by using a command (CMD) and an address (ADDR). For example, the memory controller 100 and the memory device 200 may be connected by using individual pins and individual transmission lines to exchange the command (CMD), the address (ADDR), or the data (DQ).

The memory controller 100 may control the memory device 200 in response to a command from a host 20. The host 20 may communicate with the memory controller 100 by using interface protocols such as peripheral component interconnect express (PCIe), advanced technology attachment (ATA), serial ATA (SATA), parallel ATA (PATA), and serial attached SCSI (SAS). In addition, the interface protocols between the host 20 and the memory controller 100 are not limited to the above examples, and may include other interface protocols such as universal serial bus (USB), multi-media card (MMC), enhanced small disk interface (ESDI), and integrated drive electronics (IDE).

The memory device 200 may be a dynamic random access memory (DRAM), such as double data rate synchronous dynamic random access memory (DDR SDRAM), low power double data rate (LPDDR) SDRAM, graphics double data rate (GDDR) SDRAM, low power DDR (LPDDR), and rambus dynamic random (RDRAM).

The memory device 200 may perform self-refresh by itself. For example, the memory device 200 may perform self-refresh without intervention of the memory controller 100. In this case, the memory device 200 may perform self-refresh in units of word lines. The memory controller 100 may not know when the self-refresh of the memory device 200 ends. That is, even when the memory controller 100 inputs the command (CMD) to the memory device 200, when the memory device 200 is performing the self-refresh, the memory controller 100 may have to wait for a predetermined time.

In a related memory device, even if a command CMD is inputted during the self-refresh, it is necessary to refresh a predetermined number of word lines. In comparison, because the memory device 200 according to embodiments performs the self-refresh in units of one word line, when the command CMD is inputted during the self-refresh, the memory device 200 may perform the refresh only to the corresponding word line, may stop the refresh of the word line to be refreshed after the corresponding word line, and may process the command CMD, so that the time from exit self-refresh to valid commands may be shortened. A joint electron device engineering council (JEDEC) standard defines the time from exit self-refresh to valid commands using a symbol tXSR.

Accordingly, because the tXSR of the memory device 200 is shortened, it is possible to enter self-refresh even during a shorter idle time, thereby reducing power consumption. In addition, the performance of the memory device 200 may be improved by reducing a penalty for entering the exit self-refresh to the valid commands.

Figure 2:
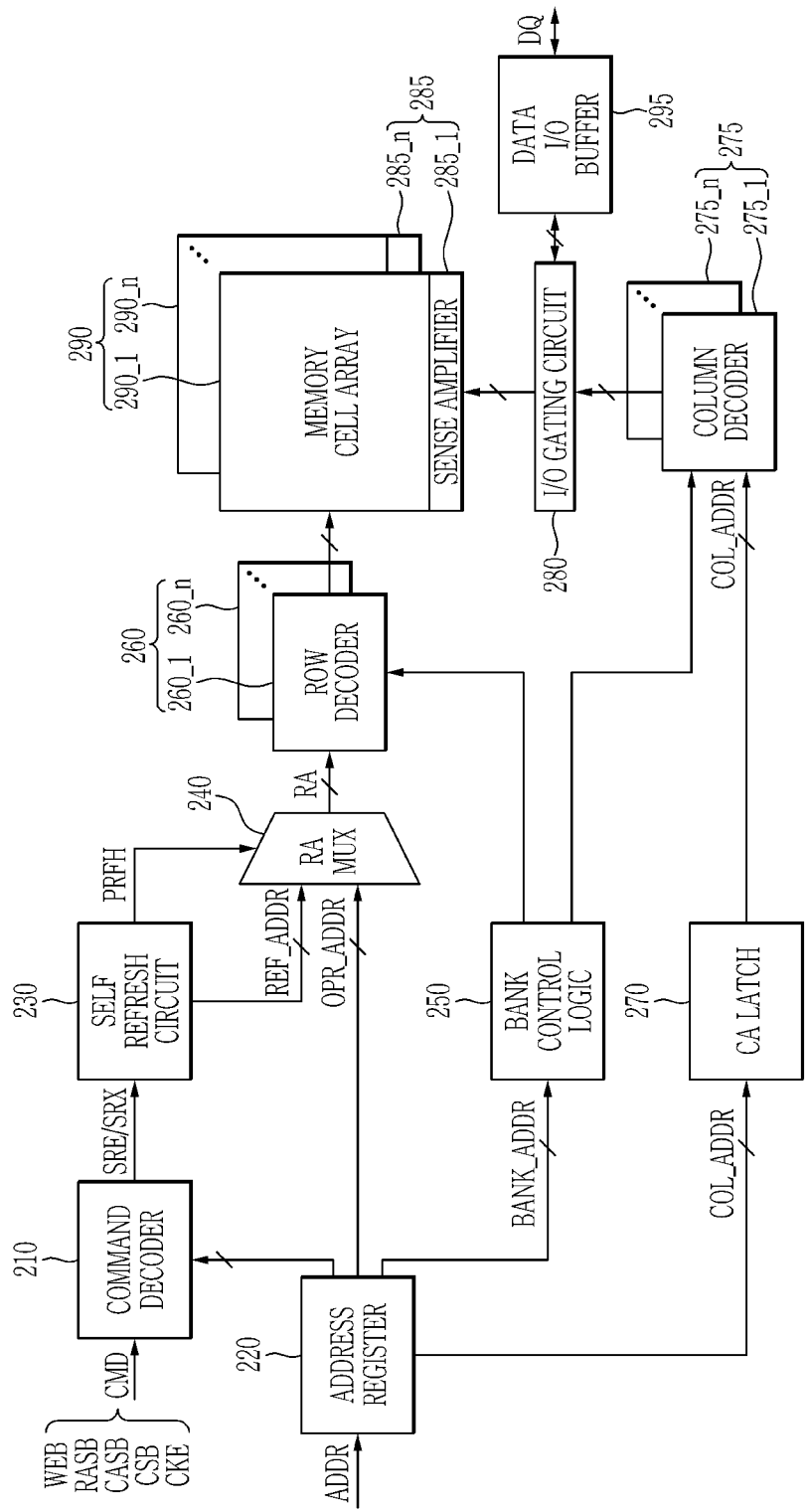
FIG. 2 illustrates a schematic block diagram of a memory device of FIG. 1 according to an embodiment.

FIG. 2 illustrates a schematic block diagram of a memory device of FIG. 1 according to an embodiment.

Referring to FIG. 2, the memory device 200 may include a command decoder 210, an address register 220, a self-refresh circuit 230, a row address multiplexer 240, a bank control logic 250, a plurality of row decoders 260, a column address latch 270, a plurality of column decoders 275, an input/output gating circuit 280, a plurality of sense amplifiers 285, a plurality of memory cell arrays 290, and a data input/output buffer 295.

The command decoder 210 may decode the command CMD received from the memory controller 100 to output a self-refresh entry signal SRE or a self-refresh exit signal SRX to the self-refresh circuit 230. The command CMD may include a write enable signal WEB, a row address strobe signal RASB, a column address strobe signal CASB, a chip select signal CSB, a clock enable signal CKE, and the like.

When the clock enable signal CKE transitions from a high level to a low level, the command decoder 210 may decode the self-refresh entry signal SRE to output it to the self-refresh circuit 230. In this case, the row address strobe signal RASB, the column address strobe signal CASB, and the chip select signal CSB may have a low level, and the write enable signal WEB may have a high level. When the clock enable signal CKE transitions from a high level to a low level, the memory device 200 may not use the clock signal CLK transmitted from the memory controller 100. Accordingly, the clock signal CLK may be toggled in different cycles, or may no longer be transmitted from the memory controller 100.

In addition, when the clock enable signal CKE transitions from a low level to a high level, the command decoder 210 may decode the self-refresh exit signal SRX to output it to the self-refresh circuit 230. In this case, the chip select signal CSB is at a high level, or the chip select signal CSB is at a low level, while the row address strobe signal RASB, the column address strobe signal CASB, and the write enable signal WEB are at a high level. Before the self-refresh exit signal SRX is outputted, the memory controller 100 may transmit a clock signal CLK oscillating at a constant cycle back to the memory device 200.

The self-refresh circuit 230 may output a refresh row address REF_ADDR and a self-refresh control signal PRFH to the row address multiplexer 240 in response to the self-refresh entry signal SRE. The refresh row address REF_ADDR may be an address of a row to be refreshed. The self-refresh circuit 230 may generate a self-refresh mode signal PSELF that is enabled in response to the self-refresh entry signal SRE and is disabled in response to the self-refresh exit signal SRX. The self-refresh mode signal PSELF may be a signal for generating the self-refresh control signal PRFH. The self-refresh circuit 230 may output the self-refresh control signal PRFH having a constant cycle and a constant pulse width to the row address multiplexer 240 as a period signal in a period in which the self-refresh mode signal PSELF is at a high level.

The self-refresh circuit 230 may perform a counting operation on the refresh row address REF_ADDR when the self-refresh control signal PRFH maintains a high level for a predetermined period. The counting operation may indicate increasing the refresh row address REF_ADDR. The predetermined period may be a period in which a predetermined number of word lines are refreshed. For example, when the predetermined number is 4, the self-refresh circuit 230 may perform a counting operation on the refresh row address REF_ADDR after four word lines are refreshed.

When the four word lines are not refreshed and only some word lines are refreshed due to, for example, the self-refresh exit signal SRX being inputted during refresh, the self-refresh circuit 230 may not perform the counting operation on the refresh row address REF_ADDR.

The row address multiplexer 240 may receive the refresh row address REF_ADDR and an operation row address OPR_ADDR, and may selectively output the refresh row address REF_ADDR or the operation row address OPR_ADDR as a row address RA to the row decoder 260 based on the self-refresh control signal PRFH. For example, the row address multiplexer 240 may output the refresh row address REF_ADDR when the self-refresh control signal PRFH is at a high level, and may output the operating row address OPR_ADDR when the self-refresh control signal PRFH is at a low level. Thus, when the self-refresh control signal PRFH is at a high level, the row address multiplexer 240 may output the refresh row address REF_ADDR, which is a target of the self-refresh, to the row decoder 260 as the row address RA, and when the self-refresh control signal PRFH is at a low level, the row address multiplexer 240 may output the operation row address OPR_ADDR to be written, read, or erased to the row decoder 260 as the row address RA.

The address register 220 may receive the address ADDR from the memory controller 100. The address ADDR may include a bank address BANK_ADDR, an operation row address OPR_ADDR, and a column address COL_ADDR. The address register 220 may provide the operation row address OPR_ADDR to the row address multiplexer 240, may provide the bank address BANK_ADDR to the bank control logic 250, and may provide the column address COL_ADDR to the column address latch 270.

The bank control logic 250 may generate a bank control signal in response to the bank address BANK_ADDR, and may output the generated bank control signal to a plurality of the row decoders 260 and a plurality of the column decoders 275. The plurality of the row decoders 260 may include first to n-th row decoders 260_1 to 260_n (n is an integer greater than 1). The plurality of the column decoders 275 may include first to n-th column decoders 275_1 to 275_n (n is an integer greater than 1). In response to the bank control signal, a row decoder corresponding to the bank address BANK_ADDR among the first to n-th row decoders 260_1 to 260_n may be activated, and a column decoder corresponding to the bank address BANK_ADDR among the first to n-th column decoders 275_1 to 275_n may be activated.

A plurality of the memory cell arrays 290 may include first to n-th memory cell arrays 290_1 to 290_n (n is an integer greater than 1). That is, the number of the plurality of the memory cell arrays 290 may be the same as the number of the plurality of the row decoders 260 and the number of the plurality of the column decoders 275. For example, n may be 8, 16, 32, or the like.

The first to n-th row decoders 260_1 to 260_n may be respectively connected to the first to n-th memory cell arrays 290_1 to 290_n. The first to n-th column decoders 275_1 to 275_n may be respectively connected to the first to n-th memory cell arrays 290_1 to 290_n. In addition, a plurality of the sense amplifiers 285 may include first to n-th sense amplifiers 285_1 to 285_n respectively connected to the first to n-th memory cell arrays 290_1 to 290_n.

The first to n-th row decoders 260_1 to 260_n, the first to n-th column decoders 275_1 to 275_n, the first to n-th sense amplifiers 285_1 to 285_n, and the first to n-th memory cell arrays 290_1 to 290_n may respectively configure first to n-th banks. Each of the first to n-th memory cell arrays 290_1 to 290_n may include a plurality of word lines and a plurality of bit lines, and a plurality of memory cells formed at intersections of the word lines and the bit lines. Each memory cell may have a DRAM cell structure. A word line to which the memory cell is connected may be designated as a row, and a bit line to which the memory cell is connected may be designated as a column.

A row decoder activated by the bank control logic 250 among the first to n-th row decoders 260_1 to 260_n may decode the row address RA outputted from the row address multiplexer 240 to activate a word line corresponding to the row address RA. For example, the activated row decoder may apply a word line driving voltage to the word line corresponding to the row address RA.

The column address latch 270 may receive the column address COL_ADDR from the address register 220, and may temporarily store the column address COL_ADDR. The column address latch 270 may apply the temporarily stored column address COL_ADDR to the plurality of the column decoders 275, respectively.

The column decoder 275 may activate the sense amplifier 285 through the input/output gating circuit 280. For example, a column decoder activated by the bank control logic 250 among the first to n-th column decoders 275_1 to 275_n may activate a sense amplifier corresponding to the bank address BANK_ADDR and the column address COL_ADDR among the first to n-th sense amplifiers 285_1 to 285_n through the input/output gating circuit 280.

The input/output gating circuit 280 may include a circuit for gating input and output data, an input data mask logic, a read data latch for storing data outputted from the memory cell array 290, and a write driver for writing data to the memory cell array 290.

Data DQ read from one of the first to n-th memory cell arrays 290_1 to 290_n may be sensed by a sense amplifier corresponding to the memory cell array and may be stored in the read data latch. The data DQ stored in the read data latch may be provided to the memory controller 100 through the data input/output buffer 295. In addition, the data DQ to be written into one of the first to n-th memory cell arrays 290_1 to 290_n may be provided from the memory controller 100 to the data input/output buffer 295. The data DQ provided to the data input/output buffer 295 may be written into one memory cell array through the write driver.

Although the high level has been described as the enable level in FIG. 2, embodiments are not limited thereto, and the low level may be implemented as the enable level.

Figure 3:
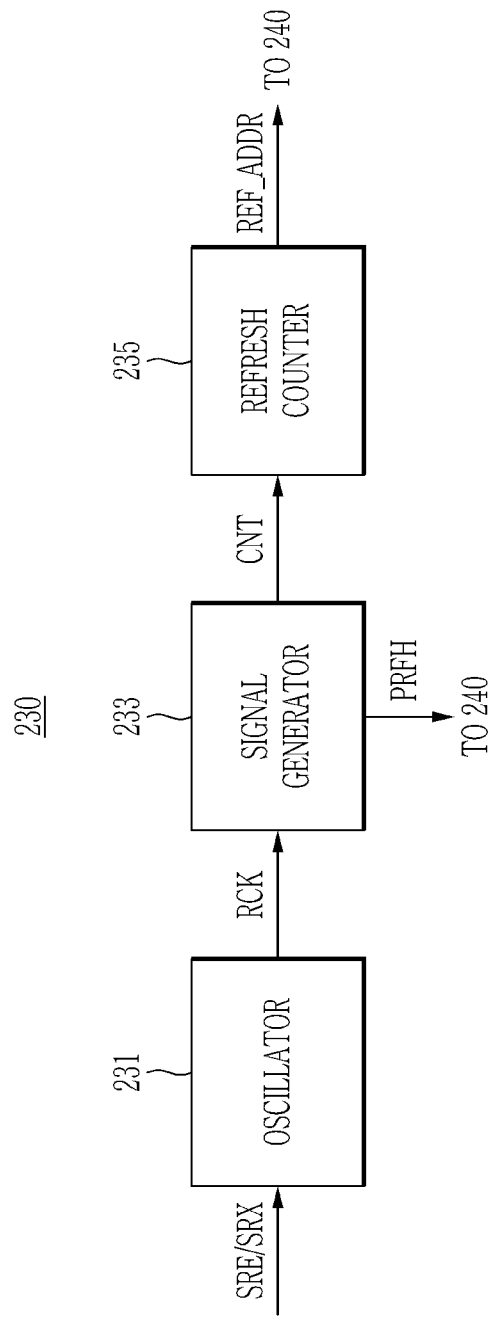
FIG. 3 illustrates a schematic block diagram of a self-refresh circuit according to an embodiment.

FIG. 3 illustrates an example of a schematic block diagram of the self-refresh circuit of FIG. 2.

Referring to FIG. 2 and FIG. 3, the self-refresh circuit 230 according to embodiments may include an oscillator 231, a signal generator 233, and a refresh counter 235.

The oscillator 231 may be activated in response to the self-refresh entry signal SRE from the command decoder 210, and may generate an oscillation signal RCK and output the oscillation signal RCK to the signal generator 233. In addition, the oscillator 231 may be deactivated in response to the self-refresh exit signal SRX from the command decoder 210, and may stop generating the oscillation signal RCK. That is, the oscillator 231 may be activated when the memory device 200 performs self-refresh, and may be deactivated when the memory device 200 stops self-refresh.

The signal generator 233 may output the self-refresh control signal PRFH at a high level in response to a rising edge of the oscillation signal RCK. The signal generator 233 may generate the self-refresh control signal PRFH with a predetermined pulse width and a predetermined period. When the oscillator 231 does not output the oscillation signal RCK, that is, when the oscillation signal RCK no longer toggles, the signal generator 233 may output the self-refresh control signal PRFH at a low level. The signal generator 233 may output the self-refresh control signal PRFH to the row address multiplexer 240. The row address multiplexer 240 may perform a signal selection operation by using the self-refresh control signal PRFH.

The signal generator 233 may output a counter control signal CNT to instruct the refresh counter 235 to output the refresh row address REF_ADDR designating a memory cell row to be refreshed to the row address multiplexer 240 at the rising edge of the self-refresh control signal PRFH. The refresh counter 235 may output the refresh row address REF_ADDR to the row address multiplexer 240. The refresh row address REF_ADDR may be a bit string including p (p is an integer greater than or equal to 2) bits including a most significant bit (MSB) and a least significant bit (LSB).

The refresh counter 235 may commonly manage addresses of the first to n-th memory cell arrays 290_1 to 290_n. For example, when the refresh row address REF_ADDR indicates a 296-th word line, it may indicate a 296-th word line of each of the first to n-th memory cell arrays 290_1 to 290_n.

In addition, the signal generator 233 may determine whether the self-refresh control signal PRFH maintains a high level for a predetermined period based on the oscillation signal RCK. For example, the signal generator 233 may determine whether the self-refresh control signal PRFH is at a high level for a predetermined period by counting the number of toggles of the oscillation signal RCK.

When the self-refresh control signal PRFH is at a high level for a predetermined period, the signal generator 233 may output the counter control signal CNT in response to a falling edge of the pulse signal PRFH to the refresh counter 235.

The refresh counter 235 may perform a counting operation on the refresh row address REF_ADDR in response to the counter control signal CNT. The counting operation may refer to an operation of increasing a bit of the refresh row address REF_ADDR by 1. For example, the refresh counter 235 may increment the MSB of the refresh row address REF_ADDR by 1 or the LSB of the refresh row address REF_ADDR by 1. The refresh counter 235 may output the refresh row address REF_ADDR on which the counting operation is performed to the row address multiplexer 240.

Figure 4:
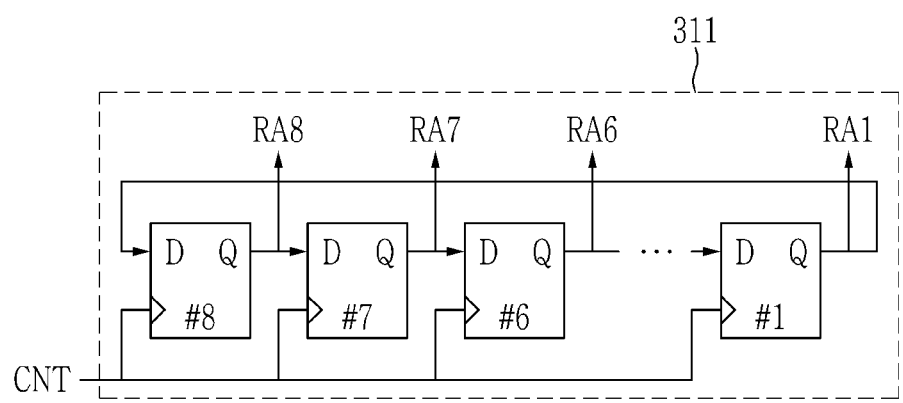
FIG. 4 illustrates a circuit diagram of a refresh counter according to an embodiment.
Figure 4:
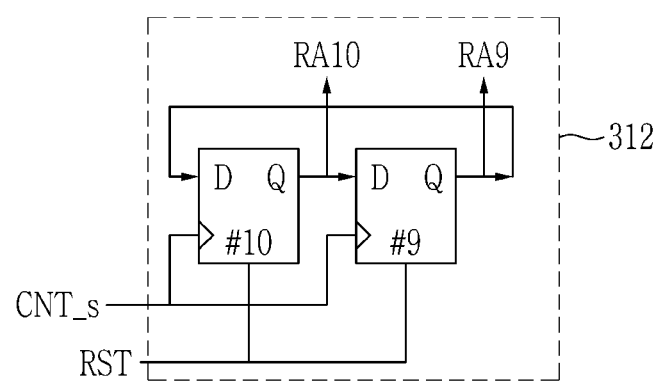

FIG. 4 illustrates a circuit diagram of a refresh counter according to an embodiment, and FIG. 5 illustrates an example of a refresh row address generated by the refresh counter of FIG. 4.

Referring to FIG. 4, a refresh counter 310, an example of the refresh counter 235, may include a main counter 311 and a sub-counter 312. The main counter 311 and the sub-counter 312 may include a plurality of flip-flops. The main counter 311 may perform a counting operation on first to eighth bits RA1 to RA8 among the refresh row addresses REF_ADDR, and the sub-counter 312 may perform a counting operation on ninth and tenth bits RA9 and RA10 among the refresh row addresses REF_ADDR.

The main counter 311 may perform a counting operation based on the counter control signal CNT. The main counter 311 may perform a counting operation in units of four word lines. That is, when four word lines are refreshed, the main counter 311 may perform a counting operation. When four word lines are not refreshed and are stopped in the middle, for example when the self-refresh exit signal SRX is input during the refresh, the main counter 311 may not perform a counting operation.

When the first self-refresh is performed, the main counter 311 may receive the counter control signal CNT and may count the eighth bit RA8 of the refresh row address REF_ADDR as 1. When the second self-refresh is performed, the main counter 311 may receive the counter control signal CNT, and may count the eighth bit RA8 of the refresh row address REF_ADDR as 0 and the seventh bit RA7 thereof as 1. When the third self-refresh is performed, the main counter 311 may receive the counter control signal CNT, and may count the eighth bit RA8 of the refresh row address REF_ADDR as 1 and the seventh bit RA7 thereof as 1. In FIG. 5, the counting operation of the main counter 311 is shown in reference numeral 352.

The sub-counter 312 may perform a counting operation based on a sub-counter control signal CNT_s. The signal generator 233 may output the sub-counter control signal CNT_s based on the oscillation signal RCK. For example, the signal generator 233 may output the counter control signal CNT when the self-refresh control signal PRFH is at a high level for a first time period, and may output the sub-counter control signal CNT_s when the self-refresh control signal PRFH is at a high level for a second time period. The first time period may be four times as long as the second time period. That is, because the sub-counter control signal CNT_s is inputted four times when the self-refresh control signal PRFH is at a high level for the first time period, four word lines may be refreshed by one self-refresh control signal PRFH.

The sub-counter 312 may perform a counting operation on the ninth bit RA9 and the tenth bit RA10 of the refresh row address REF_ADDR when one word line is refreshed. The sub-counter 312 may allow the four word lines to be sequentially refreshed at the high level of the self-refresh control signal PRFH by performing a counting operation such as 00, 10, 01, and 11 whenever one word line is refreshed. In FIG. 5, the counting operation of the sub-counter 312 is shown in reference numeral 351.

The signal generator 233 may output the reset signal RST in response to the rising edge of the self-refresh control signal PRFH. The sub-counter 312 may reset the flip-flops in response to the reset signal RST.

Although it has been described that the refresh row address REF_ADDR is configured of 10 bits in FIG. 4 and FIG. 5, embodiments are not limited thereto, and the refresh row address REF_ADDR may be implemented as a bit string of various bits according to embodiments, and accordingly, the number of flip-flops in the refresh counter may be variously configured.

In addition, although the configuration in which the sub-counter 312 performs the counting operation with two bits to sequentially refresh the four word lines has been described, it may be implemented in various embodiments such as sequentially refreshing two word lines by performing a counting operation with one bit, or sequentially refreshing eight word lines by performing a counting operation with three bits.

Figure 6:
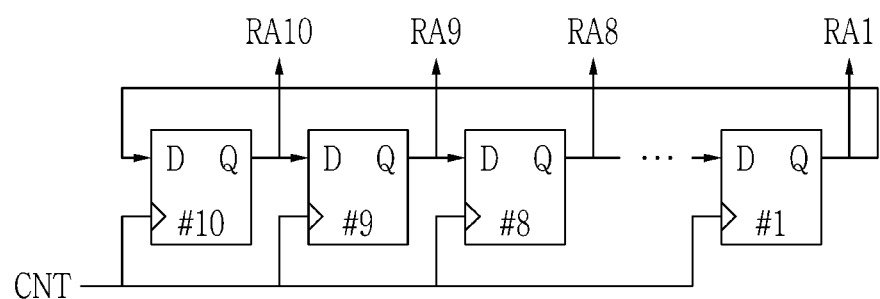
FIG. 6 illustrates a circuit diagram of a refresh counter according to an embodiment.

FIG. 6 illustrates a circuit diagram of a refresh counter according to an embodiment, and FIG. 7 illustrates an example of a refresh row address generated by the refresh counter of FIG. 6.

Referring to FIG. 6 and FIG. 7, a refresh counter 320, another example of the refresh counter 235, may perform a counting operation based on a counter control signal CNT. The refresh counter 320 may perform a counting operation in units of one word line. That is, when the one word line is refreshed, the refresh counter 320 may perform a counting operation.

When the first self-refresh is performed, the refresh counter 320 may receive the counter control signal CNT and may count the tenth bit RA10 of the refresh row address REF_ADDR as 1. When the second self-refresh is performed, the refresh counter 320 may receive the counter control signal CNT, and may count the tenth bit RA10 of the refresh row address REF_ADDR as 0 and the ninth bit RA9 thereof as 1. When the third self-refresh is performed, the refresh counter 320 may receive the counter control signal CNT, and may count the tenth bit RA10 of the refresh row address REF_ADDR as 1 and the ninth bit RA9 thereof as 1. In FIG. 7, the counting operation of the refresh counter 320 is shown in reference numeral 360.

Although it has been described that the refresh row address REF_ADDR is configured of 10 bits in FIG. 6 and FIG. 7, embodiments are not limited thereto, and the refresh row address REF_ADDR may be implemented as a bit string of various bits according to embodiments, and accordingly, the number of flip-flops may be variously configured.

Figure 8:
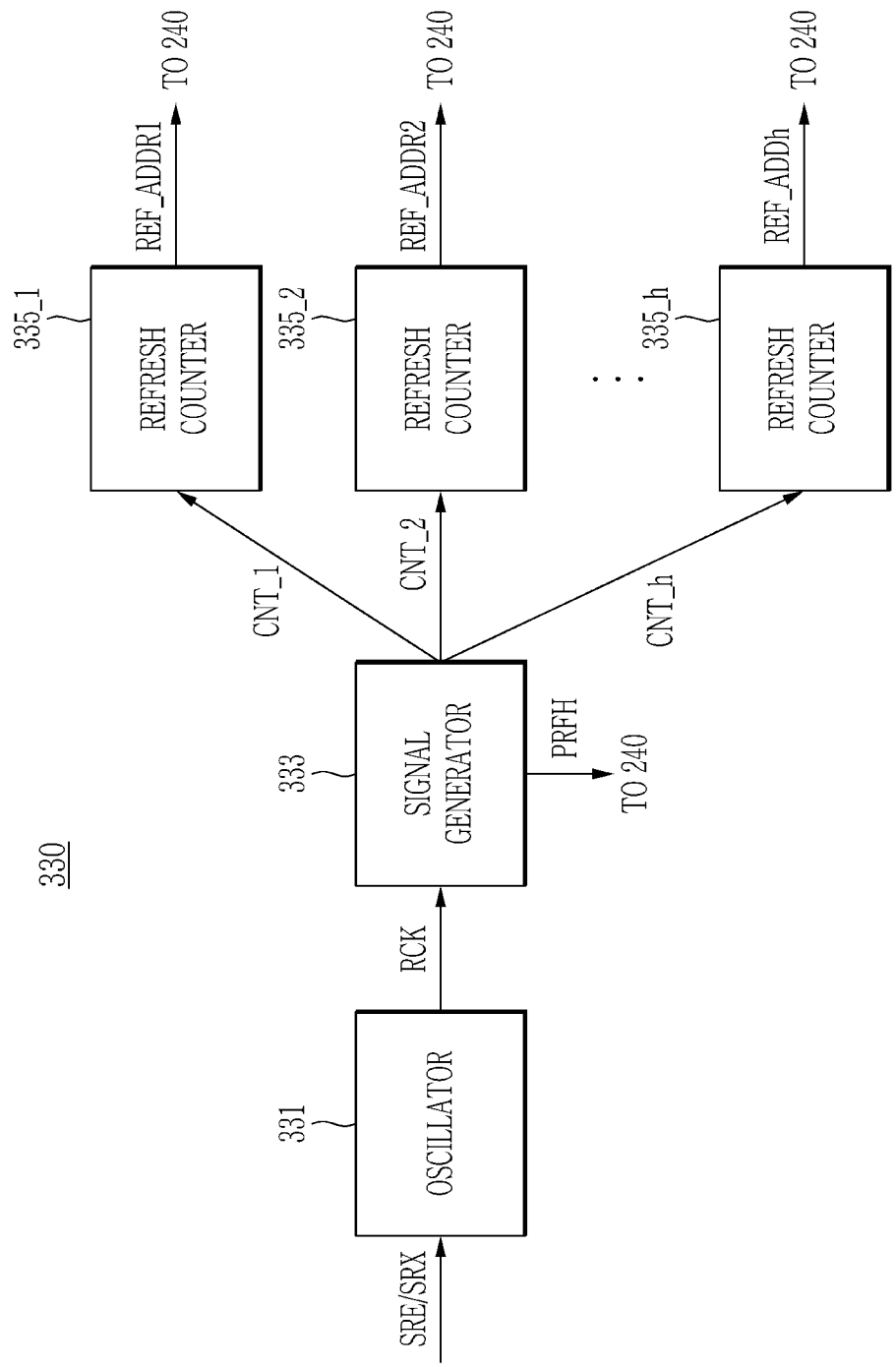
FIG. 8 illustrates a schematic block diagram of a self-refresh circuit according to an embodiment.

FIG. 8 illustrates a schematic block diagram of a self-refresh circuit according to another embodiment.

Referring to FIG. 2 and FIG. 8, the self-refresh circuit 230 of FIG. 2 may be implemented as a self-refresh circuit 330 of FIG. 8. The self-refresh circuit 330 may include an oscillator 331, a signal generator 333, and a plurality of refresh counters 335_1 to 335_h.

The oscillator 331 may be activated in response to the self-refresh entry signal SRE from the command decoder 210, and may generate an oscillation signal RCK and output the oscillation signal RCK to the signal generator 333. In addition, the oscillator 331 may be deactivated in response to the self-refresh exit signal SRX from the command decoder 210, and may stop generating the oscillation signal RCK. That is, the oscillator 331 may be activated when the memory device 200 performs self-refresh, and may be deactivated when the memory device 200 stops self-refresh.

The signal generator 333 may output the self-refresh control signal PRFH at a high level in response to the rising edge of the oscillation signal RCK. The signal generator 333 may generate the self-refresh control signal PRFH with a predetermined pulse width and a predetermined period. That is, the self-refresh control signal PRFH may include a plurality of high level periods. The plurality of refresh counters 335_1 to 335_h may be activated in different high level periods, respectively. For example, the plurality of high level periods may include a first high level period and a second high level period. The first refresh counter 335_1 may output a first refresh row address REF_ADDR1 in the first high level period, and the second refresh counter 335_2 may output a second refresh row address REF_ADDR2 in the second high level period. Similarly, the plurality of high level periods may further include other high level periods, which may cause other refresh counters to output a refresh row address.

When the oscillator 331 does not output the oscillation signal RCK, that is, when the oscillation signal RCK no longer toggles, the signal generator 333 may output the self-refresh control signal PRFH at a low level. The signal generator 333 may output the self-refresh control signal PRFH to the row address multiplexer 240. The row address multiplexer 240 may perform a signal selection operation by using the self-refresh control signal PRFH.

The signal generator 333 may instruct, by outputting a counting control signal, one of a plurality of refresh counters 335_1 to 335_h to output the refresh row addresses REF_ADDR1 to REF_ADDRh designating a memory cell row to be refreshed to the row address multiplexer 240 at the rising edge of the self-refresh control signal PRFH. The refresh row addresses REF_ADDR1 to REF_ADDRh may be a bit string including p (p is an integer of 2 or more) bits including the MSB and the LSB.

In embodiments, the plurality of refresh counters 335_1 to 335_h may respectively correspond to the first to n-th memory cell arrays 290_1 to 290_n. In this case, n and h may be the same. That is, the first refresh counter 335_1 may manage the address of the first memory cell array 290_1, the second refresh counter 335_2 may manage the address of the second memory cell array 290_2, and the h-th refresh counter 335_h may manage the address of the n-th memory cell array 290_n. In this case, noise generated when one memory cell array is refreshed may not propagate to another memory cell array.

In another embodiment, each of the plurality of refresh counters 335_1 to 335_h may commonly manage addresses of two or more of the first to n-th memory cell arrays 290_1 to 290_n. For example, the first refresh counter 335_1 may commonly manage addresses of the first and second memory cell arrays 290_1 and 290_2, the second refresh counter 335_2 may commonly manage addresses of the third and fourth memory cell arrays 290_3 and 290_4, and the h-th refresh counter 335_h may commonly manage addresses of (n-1)-th and n-th memory cell arrays 290_n-1 and 290_n. For example, when the first refresh row address REF_ADDR1 indicates a 32-th word line, it may indicate a 32-th word line of the first and second memory cell arrays 290_1 and 290_2. When the second refresh row address REF_ADDR2 indicates a 32-th word line, it may indicate a 32-th word line of the third and fourth memory cell arrays 290_3 and 290_4. When the h-th refresh row address REF_ADDRh indicates a 32-th word line, it may indicate a 32-th word line of the (n-1)-th and the n-th memory cell arrays 290_n-1 and 290_n. In this case, noise generated when one set of memory cell arrays is refreshed may not propagate to another set of memory cell arrays. For better understanding and ease of description, one refresh counter has been described as a configuration that commonly manages the addresses of two memory cell arrays, but embodiments are not limited thereto, and it may be implemented as a configuration in which addresses of three memory cell arrays, addresses of four memory cell arrays, and the like are commonly managed.

In addition, the signal generator 333 may determine whether the self-refresh control signal PRFH maintains a high level for a predetermined period based on the oscillation signal RCK. For example, the signal generator 333 may determine whether the self-refresh control signal PRFH is at a high level for a predetermined period by counting the number of toggles of the oscillation signal RCK.

When the self-refresh control signal PRFH is at a high level for a predetermined period, the signal generator 333 may output counter control signals CNT_1 to CNT_h in response to a falling edge of the pulse signal PRFH to refresh counters 335_1 to 335_h. Specifically, the signal generator 333 may output a first counter control signal CNT_1 to a first refresh counter 335_1, may output a second counter control signal CNT_2 to a second refresh counter 335_2, and may output an h-th counter control signal CNT_h to an h-th refresh counter 335_h.

The refresh counters 335_1 to 335_h may perform a counting operation on the refresh row addresses REF_ADDR1 to REF_ADDRh in response to the counter control signals CNT_1 to CNT_h. Specifically, the first refresh counter 335_1 may perform a counting operation on the first refresh row address REF_ADDR1 in response to the first counter control signal CNT_1, the second refresh counter 335_2 may perform a counting operation on the second refresh row address REF_ADDR2 in response to the second counter control signal CNT_2, and the h-th refresh counter 335_h may perform a counting operation on the h-th refresh row address REF_ADDRh in response to the h-th counter control signal CNT_h.

The counting operation may refer to an operation of increasing the bits of the refresh row addresses REF_ADDR1-REF to ADDRh by one. For example, the refresh counters 335_1 to 335_h may increment the MSB of the refresh row addresses REF_ADDR1 to REF_ADDRh by 1 or the LSB of the refresh row addresses REF_ADDR1 to REF_ADDRh by 1. The refresh counters 335_1 to 335_h may output the refresh row addresses REF_ADDR1 to REF_ADDRh on which the counting operation is performed to the row address multiplexer 240.

Figure 9:
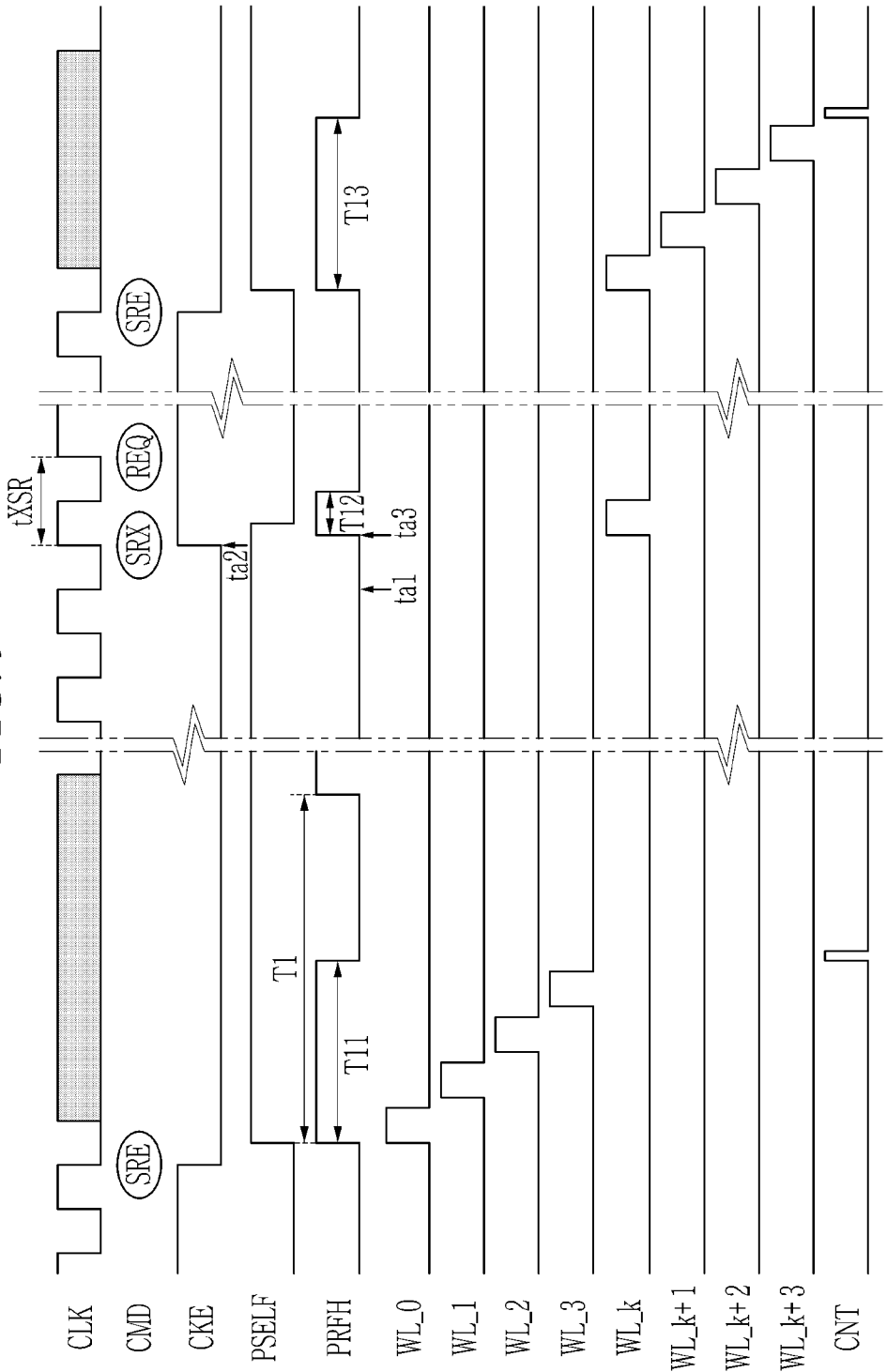
FIG. 9 illustrates a timing diagram for explaining an operation of a memory device according to an embodiment.

FIG. 9 illustrates a timing diagram for explaining an operation of a memory device according to an embodiment.

Referring to FIG. 1, FIG. 2, FIG. 3, and FIG. 9, timings of a clock signal CLK, a command signal CMD, a clock enable signal CKE, a self-refresh mode signal PSELF, a self-refresh control signal PRFH, a plurality of signals applied to a plurality of word lines WL_0 to WL_3 and WL_k to WL_k+3, and a counter control signal CNT are shown.

The clock signal CLK may be a signal that oscillates at a constant cycle. The clock signal CLK may be provided by the memory controller 100 to the memory device 200. After the output of the self-refresh entry signal SRE, the memory controller 100 may not provide the clock signal CLK to the memory device 200. Alternatively, after the output of the self-refresh entry signal SRE, the clock signal CLK may oscillate at different cycles. Before the output of the self-refresh exit signal SRX, the memory controller 100 may provide the clock signal CLK to the memory device 200.

When the clock enable signal CKE transitions from a high level to a low level, the command decoder 210 may decode the self-refresh entry signal SRE according to other signals WEB, RASB, CASB, and CSB. For example, when the row address strobe signal RASB, the column address strobe signal CASB, and the chip selection signal CSB are at a low level and when the write enable signal WEB is at a high level, the command decoder 210 may decode the self-refresh entry signal SRE.

The self-refresh circuit 230 may generate the self-refresh mode signal PSELF in response to the self-refresh entry signal SRE. The self-refresh mode signal PSELF may be a signal indicating that the memory device 200 is operating in the self-refresh mode. The self-refresh mode signal PSELF may transition to a high level in response to the self-refresh entry signal SRE, and may transition to a low level in response to the self-refresh exit signal SRX. The self-refresh mode signal PSELF may be a signal for generating the self-refresh control signal PRFH.

In the self-refresh circuit 230, the signal generator 233 may generate the self-refresh control signal PRFH in response to the oscillation signal RCK of the oscillator 231. The self-refresh control signal PRFH may be a pulse signal generated every period T1 while the self-refresh mode signal PSELF is at a high level.

In a period T11 in which the self-refresh control signal PRFH is at a high level, the memory device 200 may refresh the plurality of word lines WL_0 to WL_3 based on the refresh row address REF_ADDR. The signal generator 233 may check that the self-refresh control signal PRFH is at a high level for the period T11, that is, that the self-refresh exit signal SRX is not inputted during the period T11, and then may output the counter control signal CNT. For example, when the self-refresh control signal PRFH is at a high level even in ¾ or more of the period T11, the signal generator 233 may determine that the self-refresh control signal PRFH is a high level for the period T11. The refresh counter 235 may perform a counting operation on the refresh row address REF_ADDR in response to the counter control signal CNT.

When the clock enable signal CKE transitions from a low level to a high level, the command decoder 210 may decode the self-refresh exit signal SRX according to other signals WEB, RASB, CASB, and CSB. For example, when the chip selection signal CSB is at a high level or the chip selection signal CSB is at a low level, and when the row address strobe signal RASB, the column address strobe signal CASB, and the write enable signal WEB are at a high level, the command decoder 210 may decode the self-refresh exit signal SRX. Accordingly, the memory device 200 may refresh up to the word line WL_k, and may stop the refresh of the word line WL_k+1.

Although the self-refresh exit signal SRX is outputted at a time point ta2, when the self-refresh mode signal PSELF is still at a high level, and when it is determined that self-refresh is to be performed by the memory device 200 at a time point ta1 that is before the output of the self-refresh exit signal SRX, the signal generator 233 may output the self-refresh control signal PRFH at a time point ta3. Because there is a delay between the time point ta1 of the self-refresh execution determination of the memory device 200 and the generation time point ta3 of the self-refresh control signal PRFH of the signal generator 233, the rising edge of the self-refresh control signal PRFH is shown to be later than the output time point ta2 of the self-refresh exit signal SRX.

Because the self-refresh exit signal SRX is received, the signal generator 233 may output the self-refresh control signal PRFH during a period T12. The period T12 may be a time required to refresh one word line WL_k. In related devices, when the self-refresh control signal PRFH is generated, even when the self-refresh exit signal SRX is received, it is necessary to perform refresh on a plurality of word lines instead of one word line, so that a waiting time is long because a time tXSR from the self-refresh exit to a valid command is long. The memory device 200 according to embodiments may shorten the time tXSR from the self-refresh exit to the valid command. The valid command may indicate a request REQ.

Because the counter control signal CNT is not received, the refresh counter 235 may maintain the refresh low address REF_ADDR. That is, the refresh counter 235 may not perform a counting operation on the refresh row address REF_ADDR. Due to the self-refresh exit signal SRX during the refresh, only some word lines WL_k among the plurality of word lines WL_k to WL_k+3 to be refreshed may have been refreshed.

Thereafter, the memory device 200 may refresh the plurality of word lines WL_k to WL_k+3 in response to the self-refresh entry signal SRE. Because the counting operation has not been performed on the refresh row address REF_ADDR, the memory device 200 may perform refresh again from the word line WL_k. When it is confirmed that the refresh is performed up to the word line WL_k+3 and the self-refresh exit signal SRX has not been inputted during a period T13, the signal generator 233 may output the counter control signal CNT. The signal generator 233 may check whether the period T13 is continuously maintained by the self-refresh exit signal SRX by using the oscillation signal RCK. The refresh counter 235 may perform the counting operation on the refresh row address REF_ADDR in response to the counter control signal CNT.

In FIG. 9, for better understanding and ease of description, a configuration performing refresh on the four word lines WL_0 to WL_3 in the period T11 has been described, but embodiments are not limited thereto, and it is possible to perform refresh on two word lines, eight word lines, or the like.

In addition, for better understanding and ease of description, it has been described that the numerical references of the word lines WL_0 to WL_3 and WL_k to WL_k+3 are sequentially increased, but this does not necessarily mean that the word lines WL_0 to WL_3 and WL_k to WL_k+3 are adjacent to each other. For example, the word line WL_0 may be a 0-th word line, the word line WL_1 may be a 1023-th word line, the word line WL_2 may be a 511-th word line, and the word line WL_3 may be a 1534-th word line.

Figure 10:
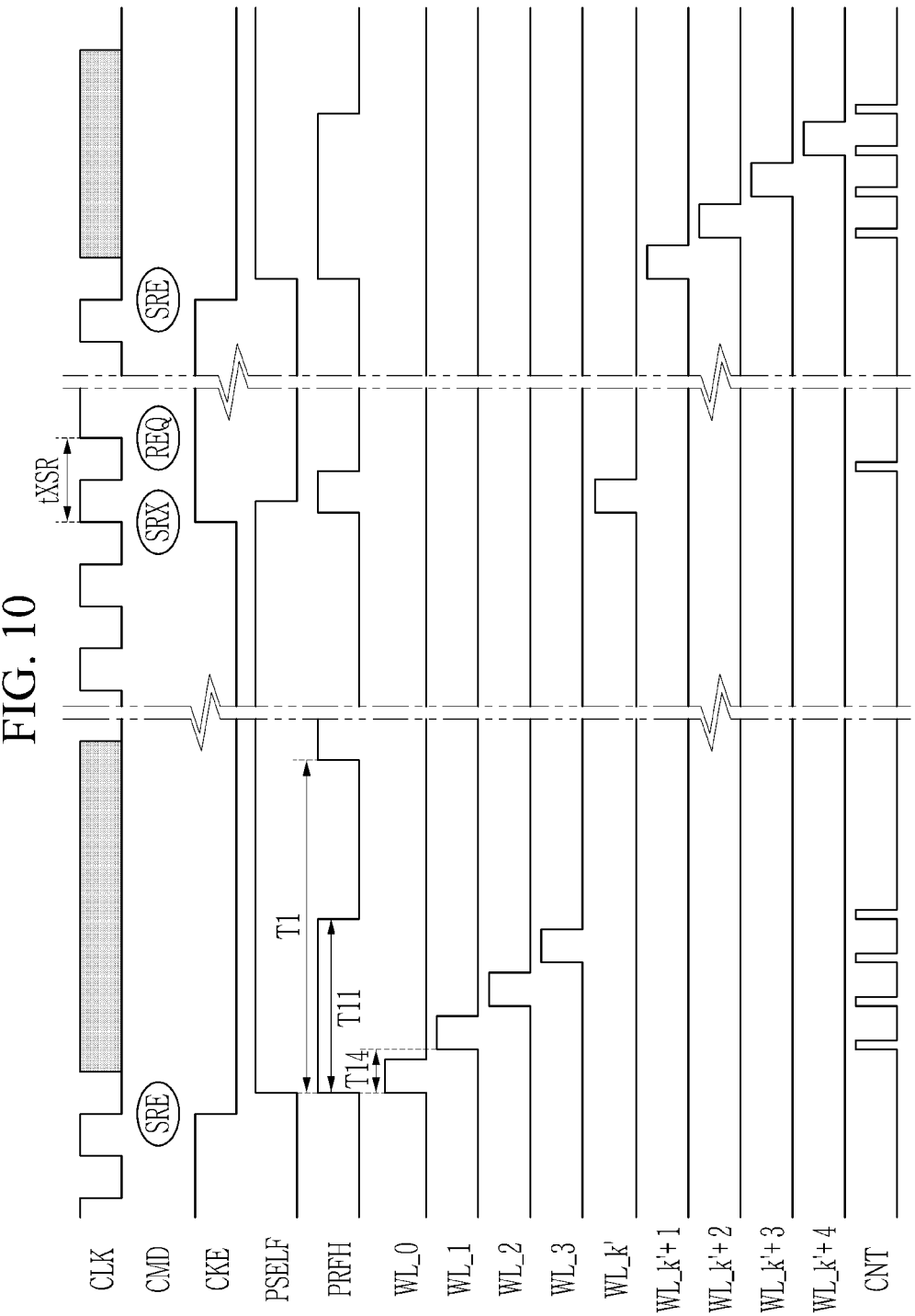
FIG. 10 illustrates a timing diagram for explaining an operation of a memory device according to an embodiment.

FIG. 10 illustrates a timing diagram for explaining an operation of a memory device according to an embodiment.

Referring to FIG. 1, FIG. 2, FIG. 3, and FIG. 10, timings of a clock signal CLK, a command signal CMD, a clock enable signal CKE, a self-refresh mode signal PSELF, a self-refresh control signal PRFH, a plurality of signals applied to a plurality of word lines WL_0 to WL_3 and WL_k' to WL_k'+4, and a counter control signal CNT are shown.

The contents of the clock signal CLK, the command signal CMD, the clock enable signal CKE, the self-refresh mode signal PSELF, and the self-refresh control signal PRFH described with reference to FIG. 9 may be equally applied to those of FIG. 10.

In a period T11 in which the self-refresh control signal PRFH is at a high level, the memory device 200 may refresh the plurality of word lines WL_0 to WL_3 based on the refresh row address REF_ADDR. The refresh counter 235 may perform a counting operation in units of one word line. For example, the period T11 has four periods in which the four word lines WL_0 to WL_3 are respectively refreshed, and in this case, during one period T14, one word line WL_0 may be refreshed, and a bit line may be precharged. When the period T14 ends, the signal generator 233 may output the counter control signal CNT. As such, the signal generator 233 may output the counter control signal CNT whenever one word line is refreshed. Accordingly, the refresh counter 235 may perform a counting operation on the refresh row address REF_ADDR whenever one word line is refreshed in response to the counter control signal CNT.

Even though the self-refresh exit signal SRX is outputted, the memory device 200 may refresh the word line WL_k' in response to the self-refresh control signal PRFH generated by the signal generator 233.

In related devices, when the self-refresh control signal PRFH is generated, even when the self-refresh exit signal SRX is received, it is necessary to perform refresh on a predetermined number of a plurality of word lines, so that a waiting time is long because a time tXSR from the self-refresh exit to a valid command is long. The memory device 200 according to embodiments may shorten the time tXSR from the self-refresh exit to the valid command. The valid command may indicate a request REQ.

Because the refresh counter 235 has performed the counting operation on the refresh row address REF_ADDR based on the counter control signal CNT, when the self-refresh entry signal SRE is received thereafter, refresh may be performed from the next word line WL_k'+1 to the word line WL_k'+4.

In FIG. 10, for better understanding and ease of description, a configuration of performing refresh on the four word lines WL_0 to WL_3 in the period T11 has been described, but embodiments are not limited thereto, and it is possible to perform refresh on two word lines, eight word lines, or the like.

In addition, for better understanding and ease of description, it has been described that the numerical references of the word lines WL_0 to WL_3 and WL_k' to WL_k'+4 are sequentially increased, but this does not necessarily mean that the word lines WL_0 to WL_3 and WL_k' to WL_k'+4 are adjacent to each other. For example, the word line WL_0 may be a 0-th word line, the word line WL_1 may be a 1023-th word line, the word line WL_2 may be a 511-th word line, and the word line WL_3 may be a 1534-th word line.

Figure 11:
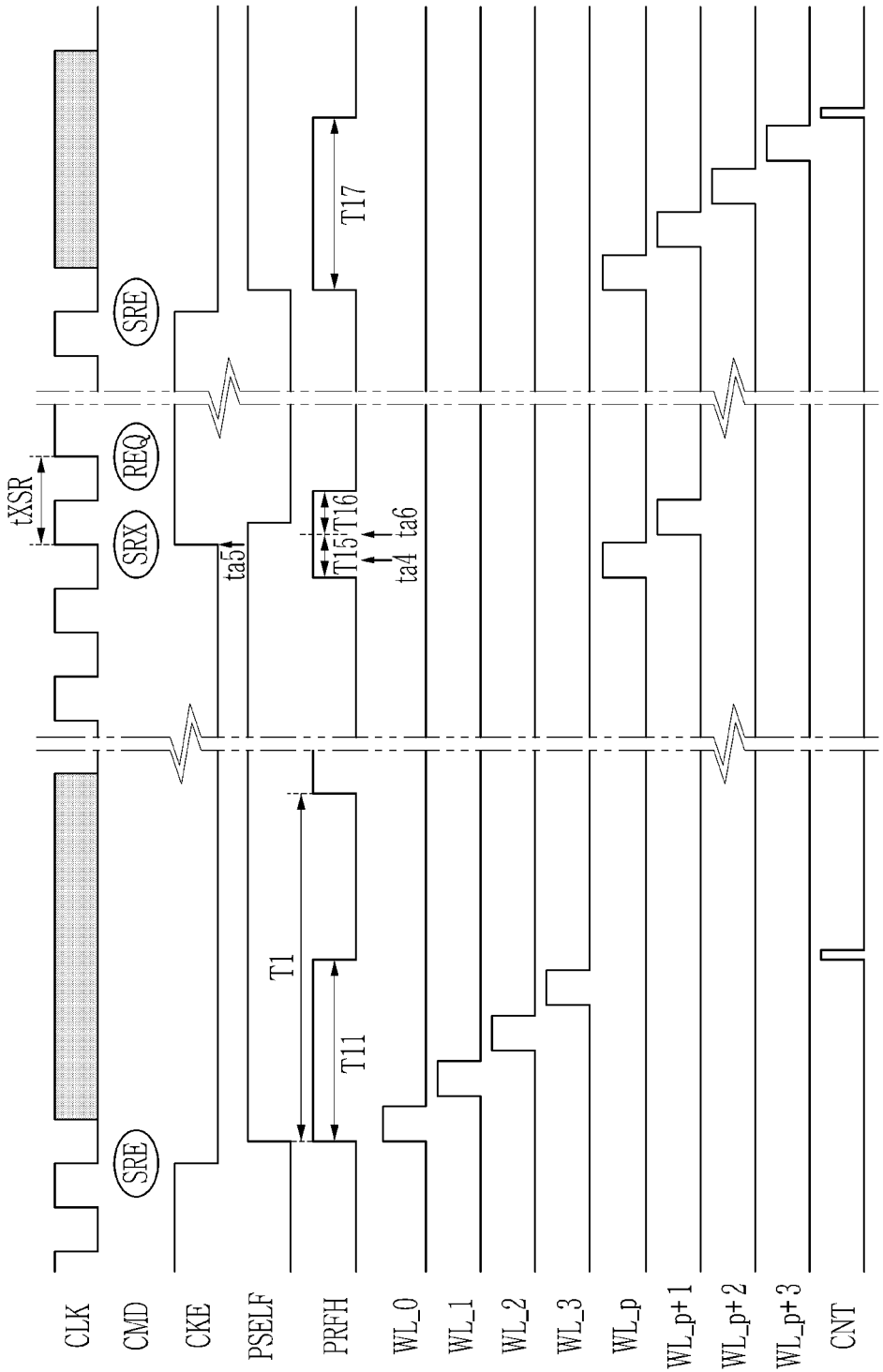
FIG. 11 illustrates a timing diagram for explaining an operation of a memory device according to an embodiment.

FIG. 11 illustrates a timing diagram for explaining an operation of a memory device according to an embodiment.

Referring to FIG. 1, FIG. 2, FIG. 3, and FIG. 11, timings of a clock signal CLK, a command signal CMD, a clock enable signal CKE, a self-refresh mode signal PSELF, a self-refresh control signal PRFH, a plurality of signals applied to a plurality of word lines WL_0 to WL_3 and WL_p to WL_p+3, and a counter control signal CNT are shown.

The contents of the clock signal CLK, the command signal CMD, the clock enable signal CKE, and the self-refresh mode signal PSELF described with reference to FIG. 9 may be equally applied to those of FIG. 11.

When the self-refresh mode signal PSELF is generated according to the self-refresh entry signal SRE, the signal generator 233 may generate the self-refresh control signal PRFH in response to the rising edge of the self-refresh mode signal PSELF. A period and a pulse width of the self-refresh control signal PRFH may correspond to a period T1 and a period T11, respectively.

When the refresh of the word lines WL_0 to WL_3 is completed in the period T11, because the self-refresh control signal PRFH has been maintained at a high level for the period T11, the signal generator 233 may generate the counter control signal CNT. The refresh counter 235 may perform a counting operation on the refresh row address REF_ADDR in response to the counter control signal CNT.

While the memory device 200 refreshes the word line WL_p in a period T15, the memory device 200 may determine to also perform the refresh on the next word line WL_p+1 at a time point ta4. Thereafter, even if the self-refresh exit signal SRX is received at a time point ta5, the self-refresh control signal PRFH is further maintained at a high level for a period T16 because the determination at the time point ta4 is fast, and the memory device 200 may refresh the word line WL_p+1 at a time point ta6.

In related devices, when the self-refresh control signal PRFH is generated, even when the self-refresh exit signal SRX is received, it is necessary to perform refresh on a predetermined number of a plurality of word lines, so that a waiting time is long because a time tXSR from the self-refresh exit to a valid command is long. The memory device 200 according to embodiments may shorten the time tXSR from the self-refresh exit to the valid command. The valid command may indicate a request REQ.

Because the counter control signal CNT has not been received after the falling edge of the self-refresh control signal PRFH, the refresh counter 235 may maintain the refresh row address REF_ADDR. That is, the refresh counter 235 may not perform a counting operation on the refresh row address REF_ADDR. Due to the self-refresh exit signal SRX during the refresh, only some word lines WL_p and WL_p+1 among the plurality of word lines WL_p to WL_p+3 to be refreshed may have been refreshed.

Thereafter, the memory device 200 may refresh the plurality of word lines WL_p to WL_p+3 in response to the self-refresh entry signal SRE. Because the counting operation has not been performed on the refresh row address REF_ADDR, the memory device 200 may perform refresh again from the word line WL_p. The signal generator 233 may check that the refresh is performed up to the word line WL_p+3 and that the self-refresh exit signal SRX has not been inputted during a period T17, and then may output the counter control signal CNT. The signal generator 233 may check whether the period T17 is continuously maintained by the self-refresh exit signal SRX by using the oscillation signal RCK. The refresh counter 235 may perform a counting operation on the refresh row address REF_ADDR in response to the counter control signal CNT.

In FIG. 11, for better understanding and ease of description, a configuration of performing refresh on the four word lines WL_0 to WL_3 in the period T11 has been described, but embodiments are not limited thereto, and it is possible to perform refresh on two word lines, eight word lines, or the like.

In addition, for better understanding and ease of description, it has been described that the numerical references of the word lines WL_0 to WL_3 and WL_p to WL_p+3 are sequentially increased, but this does not necessarily mean that the word lines WL_0 to WL_3 and WL_p to WL_p+3 are adjacent to each other. For example, the word line WL_0 may be a 0-th word line, the word line WL_1 may be a 1023-th word line, the word line WL_2 may be a 511-th word line, and the word line WL_3 may be a 1534-th word line.

Figure 12:
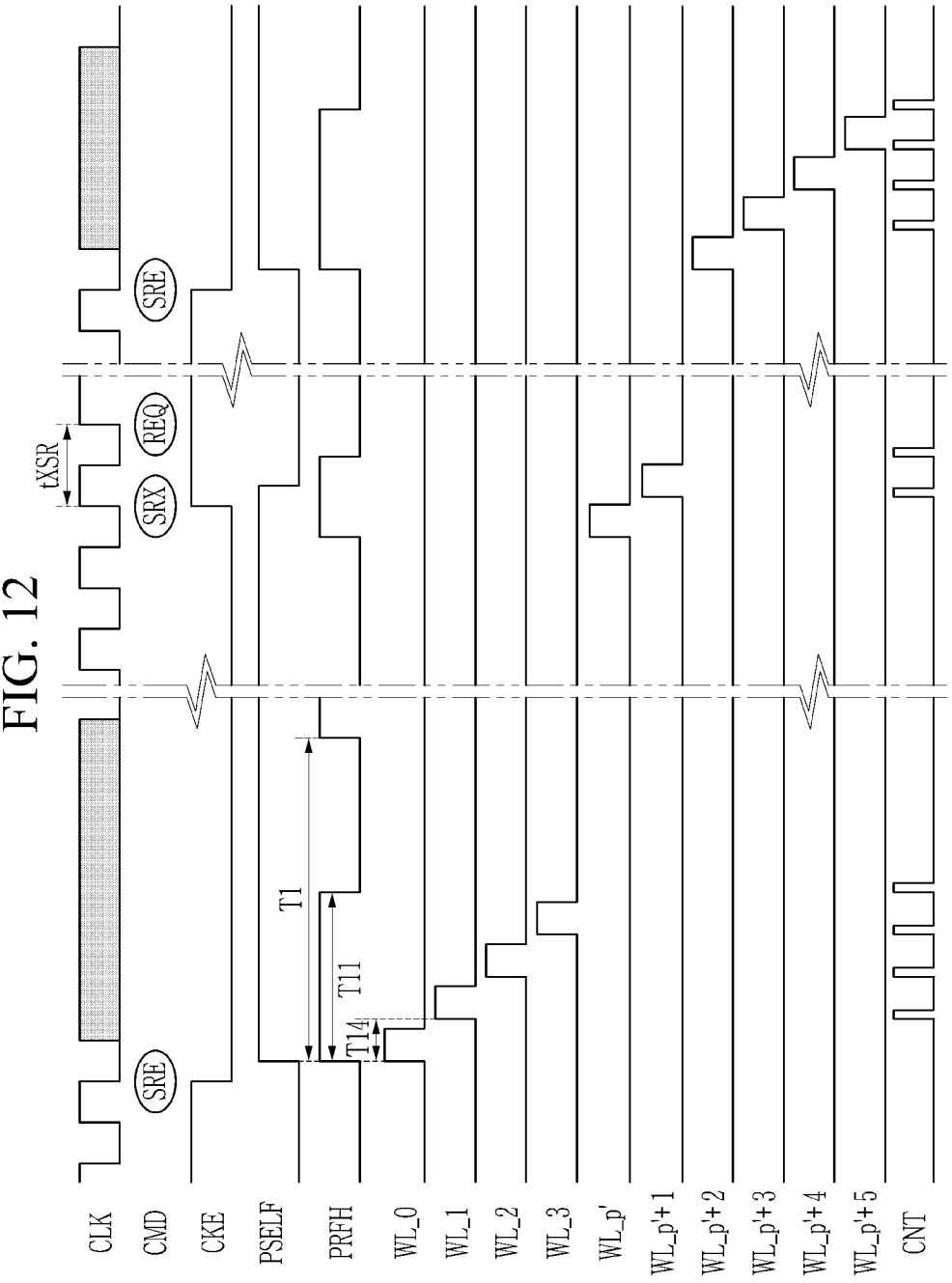
FIG. 12 illustrates a timing diagram for explaining an operation of a memory device according to an embodiment.

FIG. 12 illustrates a timing diagram for explaining an operation of a memory device according to an embodiment.

Referring to FIG. 1, FIG. 2, FIG. 3, and FIG. 12, timings of a clock signal CLK, a command signal CMD, a clock enable signal CKE, a self-refresh mode signal PSELF, a self-refresh control signal PRFH, a plurality of signals applied to a plurality of word lines WL_0 to WL_3 and WL_p' to WL_p'+5, and a counter control signal CNT are shown.

The contents of the clock signal CLK, the command signal CMD, the clock enable signal CKE, and the self-refresh mode signal PSELF described with reference to FIG. 9 may be equally applied to those of FIG. 12.

The contents of the self-refresh control signal PRFH described with reference to FIG. 11 may be equally applied to that of FIG. 12.

In a period T11 in which the self-refresh control signal PRFH is at a high level, the memory device 200 may refresh the plurality of word lines WL_0 to WL_3 based on the refresh row address REF_ADDR. The refresh counter 235 may perform a counting operation in units of one word line. For example, the period T11 has four periods in which the four word lines WL_0 to WL_3 are respectively refreshed, and in this case, during one period T14, one word line WL_0 may be refreshed, and a bit line may be precharged. When the period T14 ends, the signal generator 233 may output the counter control signal CNT. As such, the signal generator 233 may output the counter control signal CNT whenever one word line is refreshed. Accordingly, the refresh counter 235 may perform a counting operation on the refresh row address REF_ADDR whenever one word line is refreshed in response to the counter control signal CNT.

The self-refresh exit signal SRX is outputted, so that the memory device 200 may refresh the word lines WL_p' and WL_p'+1 and exit from the self-refresh. In this case, because the refresh counter 235 has performed the counting operation on the refresh row address REF_ADDR based on the counter control signal CNT, when the self-refresh entry signal SRE is received thereafter, refresh may be performed from the next word line WL_p'+2 to the word line WL_p'+5.

In FIG. 12, for better understanding and ease of description, a configuration of performing refresh on the four word lines WL_0 to WL_3 in the period T11 has been described, but embodiments are not limited thereto, and it is possible to perform refresh on two word lines, eight word lines, or the like.

In addition, for better understanding and ease of description, it has been described that the numerical references of the word lines WL_0 to WL_3 and WL_p' to WL_p'+5 are sequentially increased, but this does not necessarily mean that the word lines WL_0 to WL_3 and WL_p' to WL_p'+5 are adjacent to each other. For example, the word line WL_0 may be a 0-th word line, the word line WL_1 may be a 1023-th word line, the word line WL_2 may be a 511-th word line, and the word line WL_3 may be a 1534-th word line.

Figure 13:
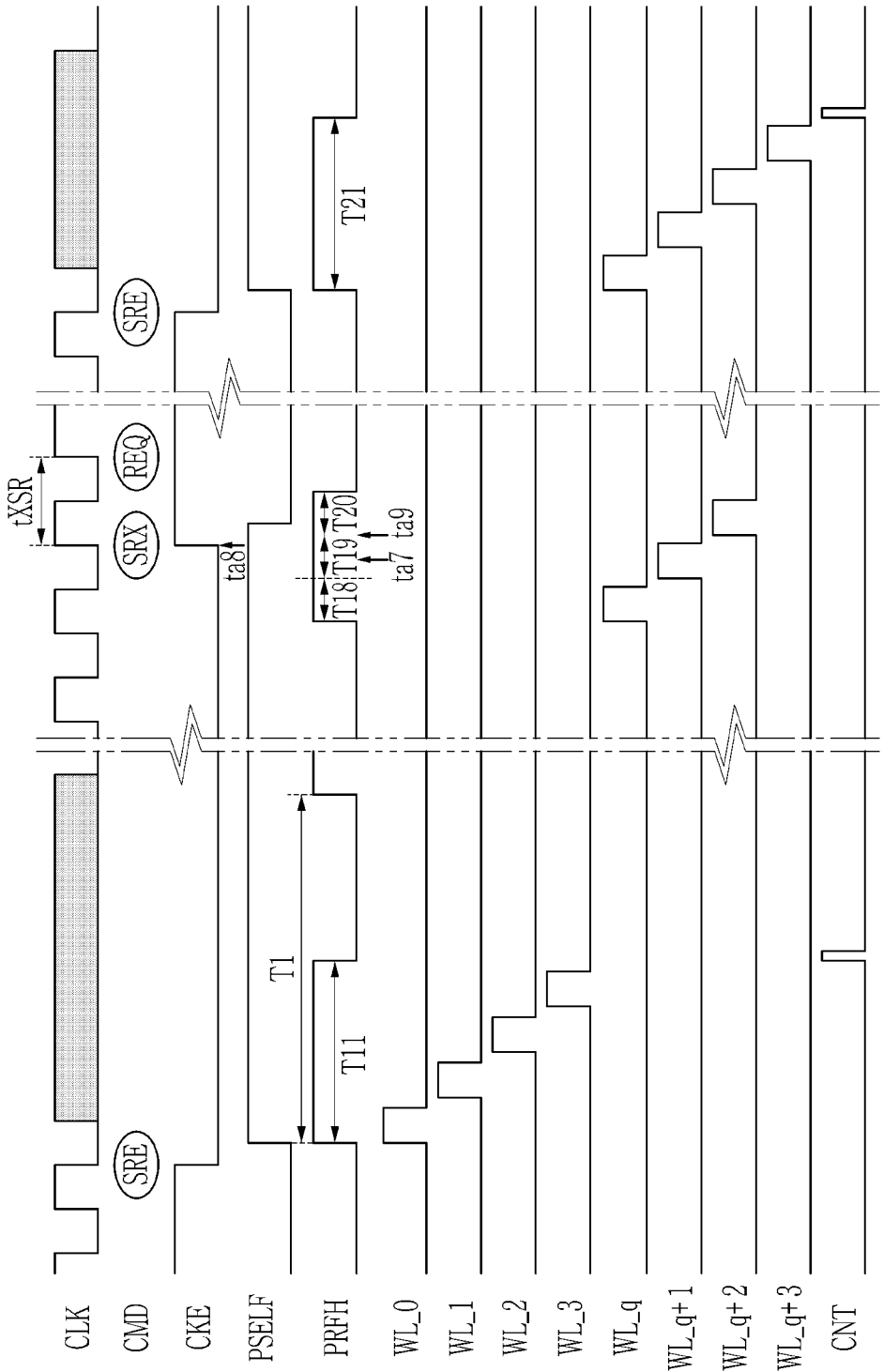
FIG. 13 illustrates a timing diagram for explaining an operation of a memory device according to an embodiment.

FIG. 13 illustrates a timing diagram for explaining an operation of a memory device according to an embodiment.

Referring to FIG. 1, FIG. 2, FIG. 3, and FIG. 13, timings of a clock signal CLK, a command signal CMD, a clock enable signal CKE, a self-refresh mode signal PSELF, a self-refresh control signal PRFH, a plurality of signals applied to a plurality of word lines WL_0 to WL_3 and WL_q to WL_q+3, and a counter control signal CNT are shown.

The contents of the clock signal CLK, the command signal CMD, the clock enable signal CKE, and the self-refresh mode signal PSELF described with reference to FIG. 9 may be equally applied to those of FIG. 13.

When the self-refresh mode signal PSELF is generated according to the self-refresh entry signal SRE, the signal generator 233 may generate the self-refresh control signal PRFH in response to the rising edge of the self-refresh mode signal PSELF. A period and a pulse width of the self-refresh control signal PRFH may correspond to a period T1 and a period T11, respectively.

The signal generator 233 may output the counter control signal CNT when the refresh of the word lines WL_0 to WL_3 is completed in the period T11. The refresh counter 235 may perform a counting operation on the refresh row address REF_ADDR in response to the counter control signal CNT.

While the memory device 200 refreshes the word line WL_q in a period T18 and refreshes the word line WL_q+1 in a period T19, the next word line WL_q+2 may also be determined to be refreshed at a time point ta7. Thereafter, even if the self-refresh exit signal SRX is received at a time point ta8, the self-refresh control signal PRFH is further maintained at a high level for a period T19 because the determination at the time point ta7 is fast, and the memory device 200 may refresh the word line WL_q+2 at a time point ta9.

In related devices, when the self-refresh control signal PRFH is generated, even when the self-refresh exit signal SRX is received, it is necessary to perform refresh on a predetermined number of a plurality of word lines, so that a waiting time is long because a time tXSR from the self-refresh exit to a valid command is long. The memory device 200 according to embodiments may shorten the time tXSR from the self-refresh exit to the valid command. The valid command may indicate a request REQ.

Because the counter control signal CNT is not received, the refresh counter 235 may maintain the refresh low address REF_ADDR. That is, the refresh counter 235 may not perform a counting operation on the refresh row address REF_ADDR. Due to the self-refresh exit signal SRX during the refresh, only some word lines WL_q to WL_q+2 among the plurality of word lines WL_q to WL_q+3 to be refreshed may have been refreshed.

Thereafter, the memory device 200 may refresh the plurality of word lines WL_q to WL_q+3 in response to the self-refresh entry signal SRE. Because the counting operation has not been performed on the refresh row address REF_ADDR, the memory device 200 may perform refresh again from the word line WL_q. The signal generator 233 may check that the refresh is performed up to the word line WL_q+3 and that the self-refresh exit signal SRX has not been inputted during a period T21, and then may output the counter control signal CNT. The signal generator 233 may check whether the period T17 is continuously maintained by the self-refresh exit signal SRX by using the oscillation signal RCK. The refresh counter 235 may perform a counting operation on the refresh row address REF_ADDR in response to the counter control signal CNT.

In FIG. 13, for better understanding and ease of description, a configuration of performing refresh on the four word lines WL_0 to WL_3 in the period T11 has been described, but embodiments are not limited thereto, and it is possible to perform refresh on two word lines, eight word lines, or the like.

In addition, for better understanding and ease of description, it has been described that the numerical references of the word lines WL_0 to WL_3 and WL_q to WL_q+3 are sequentially increased, but this does not necessarily mean that the word lines WL_0 to WL_3 and WL_q to WL_q+3 are adjacent to each other. For example, the word line WL_0 may be a 0-th word line, the word line WL_1 may be a 1023-th word line, the word line WL_2 may be a 511-th word line, and the word line WL_3 may be a 1534-th word line.

Figure 14:
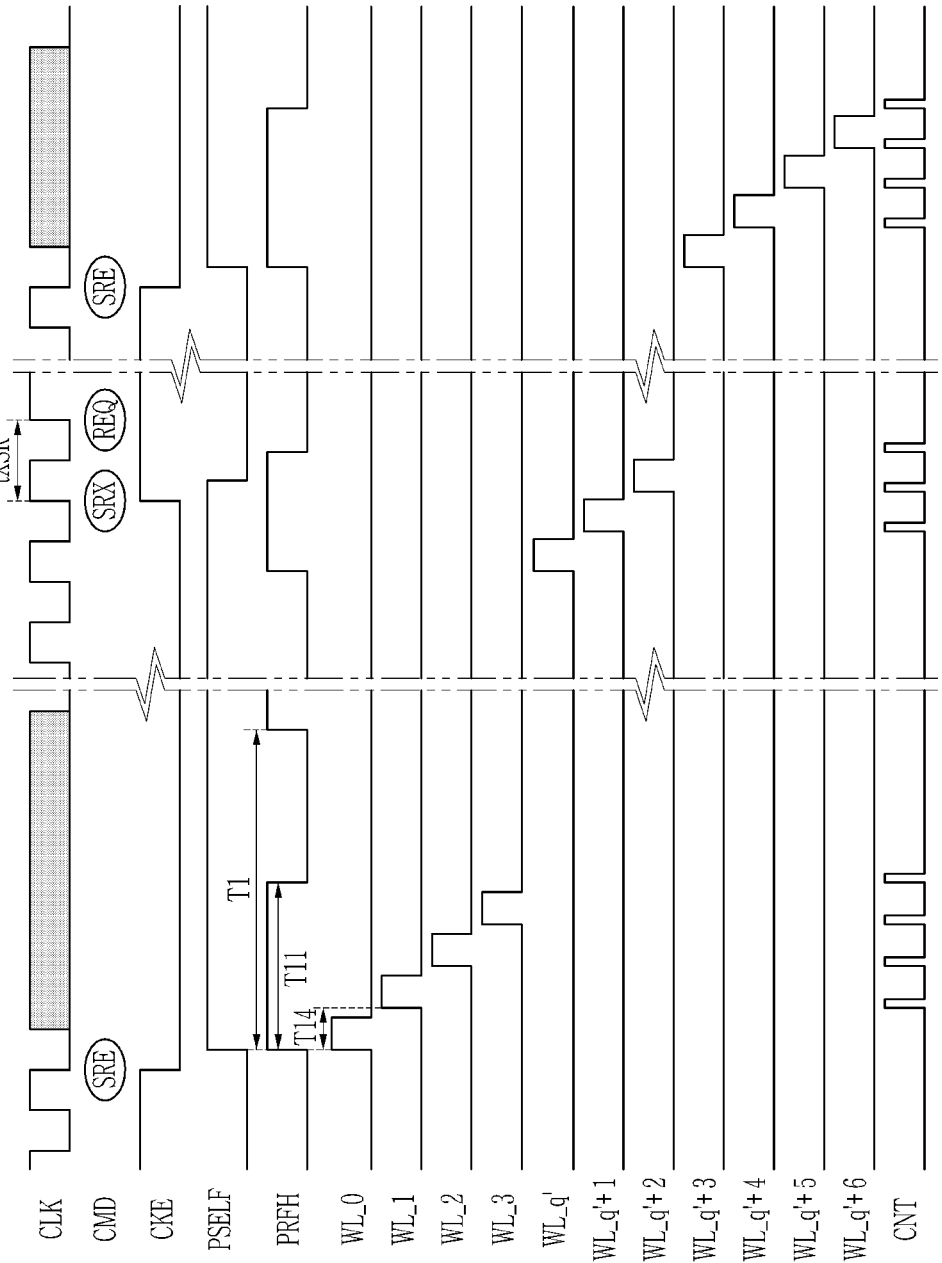
FIG. 14 illustrates a timing diagram for explaining an operation of a memory device according to an embodiment.

FIG. 14 illustrates a timing diagram for explaining an operation of a memory device according to an embodiment.

Referring to FIG. 1, FIG. 2, FIG. 3, and FIG. 14, timings of a clock signal CLK, a command signal CMD, a clock enable signal CKE, a self-refresh mode signal PSELF, a self-refresh control signal PRFH, a plurality of signals applied to a plurality of word lines WL_0 to WL_3 and WL_q' to WL_q'+6, and a counter control signal CNT are shown.

The contents of the clock signal CLK, the command signal CMD, the clock enable signal CKE, and the self-refresh mode signal PSELF described with reference to FIG. 9 may be equally applied to those of FIG. 14.

The contents of the self-refresh control signal PRFH described with reference to FIG. 13 may be equally applied to that of FIG. 14.

In a period T11 in which the self-refresh control signal PRFH is at a high level, the memory device 200 may refresh the plurality of word lines WL_0 to WL_3 based on the refresh row address REF_ADDR. The refresh counter 235 may perform a counting operation in units of one word line. For example, the period T11 has four periods in which the four word lines WL_0 to WL_3 are respectively refreshed, and in this case, during one period T14, one word line WL_0 may be refreshed, and a bit line may be precharged. When the period T14 ends, the signal generator 233 may output the counter control signal CNT. As such, the signal generator 233 may output the counter control signal CNT whenever one word line is refreshed. Accordingly, the refresh counter 235 may perform a counting operation on the refresh row address REF_ADDR whenever one word line is refreshed in response to the counter control signal CNT.

The self-refresh exit signal SRX is outputted, so that the memory device 200 may refresh the word lines WL_q' to WL_q'+2 and exit from the self-refresh. In this case, because the refresh counter 235 has performed the counting operation on the refresh row address REF_ADDR based on the counter control signal CNT, when the self-refresh entry signal SRE is received thereafter, refresh may be performed from the next word line WL_q'+3 to the word line WL_q'+6.

In FIG. 14, for better understanding and ease of description, a configuration of performing refresh on the four word lines WL_0 to WL_3 in the period T11 has been described, but embodiments are not limited thereto, and it is possible to perform refresh on two word lines, eight word lines, or the like.

In addition, for better understanding and ease of description, it has been described that the numerical references of the word lines WL_0 to WL_3 and WL_q' to WL_q'+5 are sequentially increased, but this does not necessarily mean that the word lines WL_0 to WL_3 and WL_q' to WL_q'+5 are adjacent to each other. For example, the word line WL_0 may be a 0-th word line, the word line WL_1 may be a 1023-th word line, the word line WL_2 may be a 511-th word line, and the word line WL_3 may be a 1534-th word line.

Figure 15:
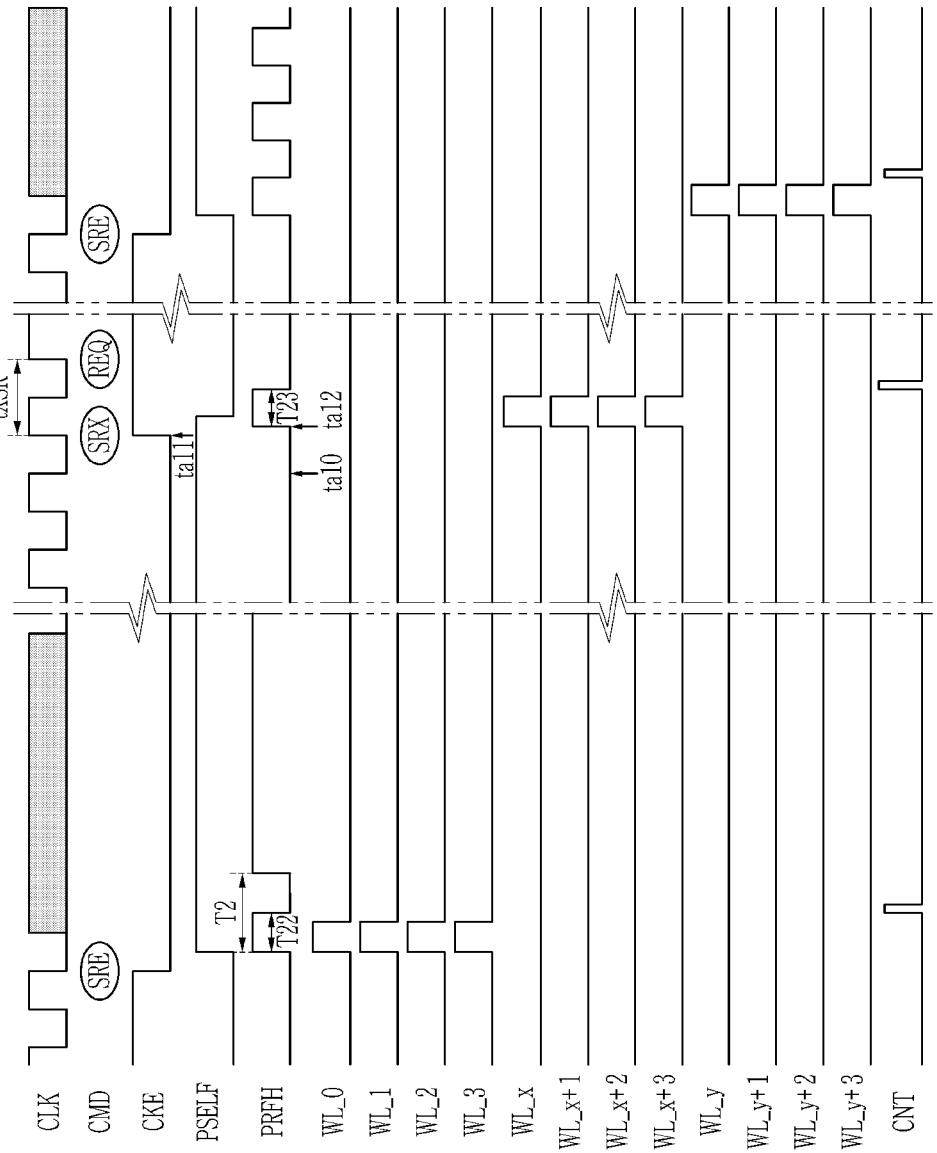
FIG. 15 illustrates a timing diagram for explaining an operation of a memory device according to an embodiment.

FIG. 15 illustrates a timing diagram for explaining an operation of a memory device according to an embodiment.

Referring to FIG. 1, FIG. 2, FIG. 3, and FIG. 15, timings of a clock signal CLK, a command signal CMD, a clock enable signal CKE, a self-refresh mode signal PSELF, a self-refresh control signal PRFH, a plurality of signals applied to a plurality of word lines WL_0 to WL_3, WL_x to WL_x+3, and WL_y to WL_y+3, and a counter control signal CNT are shown.

The contents of the clock signal CLK, the command signal CMD, the clock enable signal CKE, and the self-refresh mode signal PSELF described with reference to FIG. 9 may be equally applied to those of FIG. 15.

When the self-refresh mode signal PSELF is generated in response to the self-refresh entry signal SRE, the signal generator 233 may output the self-refresh control signal PRFH in a period T2 while the self-refresh mode signal PSELF is at a high level.

In a period T22 in which the self-refresh control signal PRFH is at a high level, the memory device 200 may refresh the plurality of word lines WL_0 to WL_3 based on the refresh row address REF_ADDR. In this case, the plurality of word lines WL_0 to WL_3 may be simultaneously refreshed. The signal generator 233 checks that the self-refresh control signal PRFH is at a high level for the period T22, that is, checks that the self-refresh exit signal SRX is not inputted during the period T22, and then may output the counter control signal CNT. The refresh counter 235 may perform a counting operation on the refresh row address REF_ADDR in response to the counter control signal CNT.

Although the self-refresh exit signal SRX is outputted at a time point ta11, when the self-refresh mode signal PSELF is still at a high level, and when it is determined for self-refresh to be performed by the memory device 200 at a time point ta10 that is before the output of the self-refresh exit signal SRX, the signal generator 233 may output the self-refresh control signal PRFH at a time point ta12. Because there is a delay between the time point ta10 of the self-refresh execution determination of the memory device 200 and the generation time point ta12 of the self-refresh control signal PRFH of the signal generator 233, the rising edge of the self-refresh control signal PRFH is shown to be later than the time point ta11 of the self-refresh exit signal SRX.

Because the self-refresh exit signal SRX is received, the signal generator 233 may output the self-refresh control signal PRFH during a period T23. The memory device 200 may refresh four word lines WL_x to WL_x+3 during the period T23. Even when the self-refresh exit signal SRX is received, the memory device 200 may process the request REQ after the period T23, so that the time tXSR from the self-refresh exit to the valid command may be shortened. The valid command may indicate a request REQ.

The signal generator 233 may check that the self-refresh control signal PRFH is at a high level for the period T23, and may output the counter control signal CNT. The refresh counter 235 may perform a counting operation on the refresh row address REF_ADDR in response to the counter control signal CNT.

Thereafter, when the self-refresh entry signal SRE is received, the memory device 200 may refresh the word lines WL_y to WL_y+3 corresponding to the next refresh row address REF_ADDR. As in the period T22, the signal generator 233 may output the counter control signal CNT, and the refresh counter 235 may perform a counting operation on the refresh row address REF_ADDR.

In FIG. 15, for better understanding and ease of description, a configuration of performing refresh on the four word lines WL_0 to WL_3 in the period T22 has been described, but embodiments are not limited thereto, and it is possible to simultaneously refresh two word lines, eight word lines, or the like.

In addition, for better understanding and ease of description, it has been described that the numerical references of the word lines WL_0 to WL_3 and WL_q' to WL_q'+5 are sequentially increased, but this does not necessarily mean that the word lines WL_0 to WL_3 and WL_q' to WL_q'+5 are adjacent to each other. For example, the word line WL_0 may be a 0-th word line, the word line WL_1 may be a 1023-th word line, the word line WL_2 may be a 511-th word line, and the word line WL_3 may be a 1534-th word line.

FIG. 16 illustrates a word line table managed by a self-refresh circuit according to an embodiment.

Referring to FIG. 1, FIG. 2, and FIG. 16, the self-refresh circuit 230 may store and manage word lines frequently accessed in the memory cell array 290 in a table 1000. The self-refresh circuit 230 may manage the table 1000 for each bank. The memory controller 100 randomly accesses an address of the memory device 200, and often intensively accesses a specific address. When a specific word line is intensively accessed, data stored in a memory cell of an adjacent word line may be changed due to a voltage in an activated state of the corresponding word line, and this phenomenon is called row hammer. The table 1000 may include a word line having the largest number of accesses and an access count of the corresponding word line. The table 1000 may manage word lines in descending order of the number of accesses.

In embodiments, in the first memory cell array 290_1, a 462-th word line may have been accessed 500 times, a 3-th word line may have been accessed 448 times, a 9-th word line may have been accessed 411 times, a 50-th word line may have been accessed 357 times, and a 1032-th word line may have been accessed 271 times.

The memory device 200 may refresh a word line adjacent to a word line in which many accesses have occurred. After the memory device 200 refreshes the adjacent word line, the self-refresh circuit 230 may reset the number of accesses of the word line, which is the basis of the refreshed word line.

In embodiments, the self-refresh circuit 230 may store a word line whose number of accesses is equal to or greater than a threshold value in the table 1000. In this case, the self-refresh circuit 230 may remove a word line that is refreshed and whose access count is reset from the table 1000.

Figure 17:
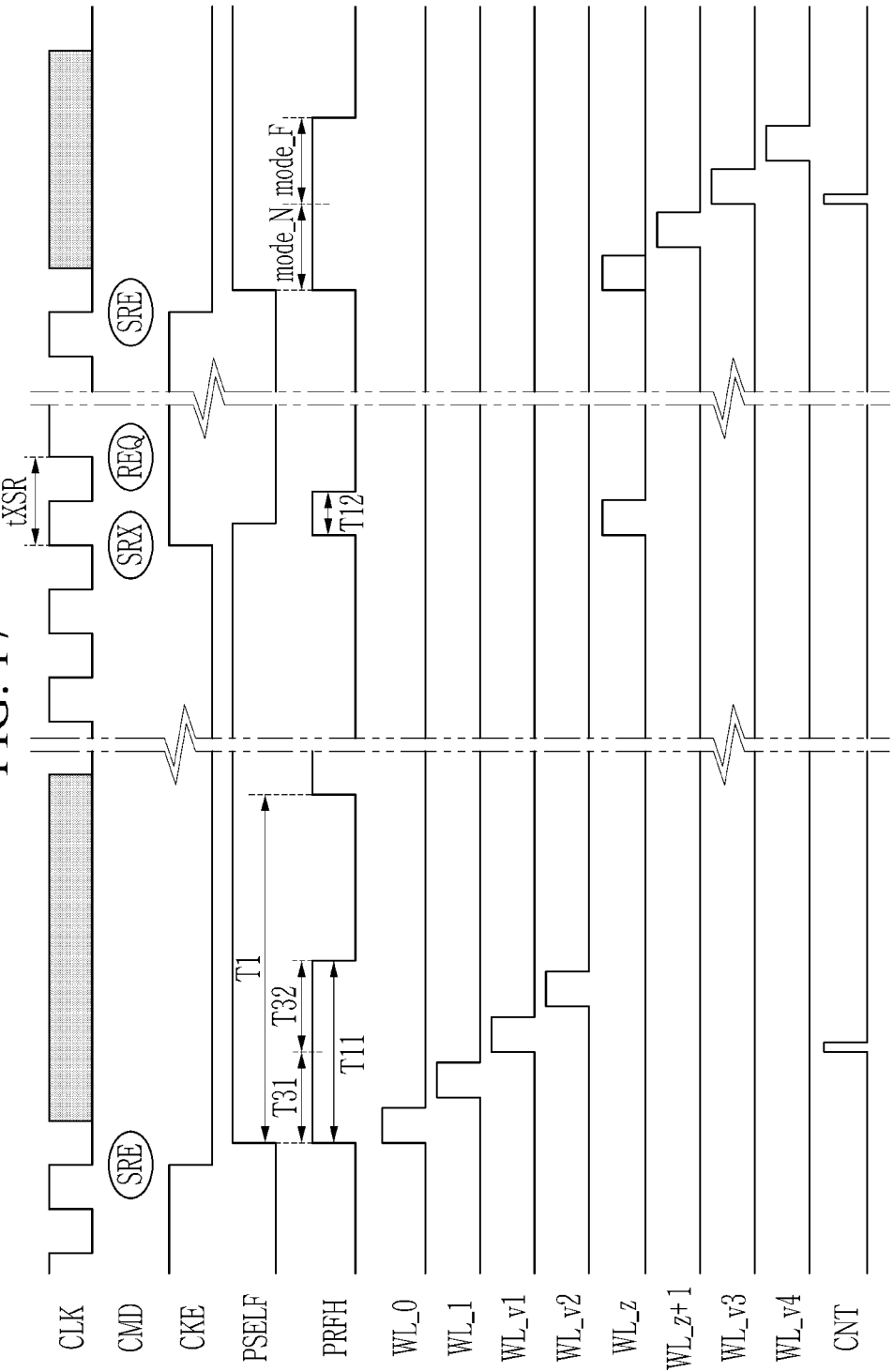
FIG. 17 illustrates a timing diagram for explaining an operation of a memory device according to an embodiment.

FIG. 17 illustrates a timing diagram for explaining an operation of a memory device according to an embodiment.

Referring to FIG. 16 and FIG. 17, timings of a clock signal CLK, a command signal CMD, a clock enable signal CKE, a self-refresh mode signal PSELF, a self-refresh control signal PRFH, a plurality of signals applied to a plurality of word lines WL_0, WL_1, WL_z, WL_z+1, and WL_v1 to WL_v4, and a counter control signal CNT are shown.

The contents of the clock signal CLK, the command signal CMD, the clock enable signal CKE, the self-refresh mode signal PSELF, and the self-refresh control signal PRFH described with reference to FIG. 9 may be equally applied to those of FIG. 17.

A period T11 may include a period T31 and a period T32. The period T31 and the period T32 may correspond to half of the period T11. The memory device 200 may refresh the word line in a mode (mode_N) in the period T31, and may refresh the word line in a mode (mode_F) in the period T32.

In the mode (mode_N), the memory device 200 may perform refresh based on the refresh row address REF_ADDR. For example, the memory device 200 may refresh the word lines WL_0 and WL_1 based on the refresh row address REF_ADDR in the period T31.

The signal generator 233 may check that the self-refresh control signal PRFH is at a high level for the period T31, and may output the counter control signal CNT. The refresh counter 235 may perform a counting operation on the refresh row address REF_ADDR in response to the counter control signal CNT.

In the mode (mode_F), the memory device 200 may perform refresh based on the table 1000. For example, the memory device 200 may refresh the word lines WL_v1 and WL_v2 based on the table 1000 in the period T32. The word lines WL_v1 and WL_v2 may be adjacent word lines of a word line having a high number of accesses in the table 1000.

In embodiments, the word line WL_v1 may be a 461-th word line that is adjacent to a 462-th word line, and the word line WL_v2 may be a 463-th word line. Alternatively, the word line WL_v1 may be the 463-th word line, and the word line WL_v2 may be the 461-th word line.

In embodiments, the word line WL_v1 may be a pair of the 461-th and 463-th word lines, and the word line WL_v2 may be a pair of second and fourth word lines, which are an adjacent word lines of a third word line.

The self-refresh circuit 230 may reset the number of accesses of the word lines that are the basis of the refreshed word lines WL_v1 and WL_v2.

When the self-refresh exit signal SRX is received, the memory device 200 may perform refresh up to the word line WL_z, and may process the request REQ. The memory device 200 may refresh the word line WL_z based on the refresh row address REF_ADDR in the mode (mode_N). In this case, because the self-refresh control signal PRFH has not been maintained at a high level for the period T31 in the period T12, the signal generator 233 may not output the counter control signal CNT, and the refresh counter 235 may maintain the refresh row address REF_ADDR.

Thereafter, the memory device 200 may refresh the plurality of word lines WL_z, WL_z+1, WL_v3, and WL_v4 in response to the self-refresh entry signal SRE.

The memory device 200 may refresh the word lines WL_z and WL_z+1 based on the refresh row address REF_ADDR in the mode (mode_N). In this case, because the self-refresh control signal PRFH has been maintained at the high level for the period T31, the signal generator 233 may output the counter control signal CNT.

The memory device 200 may refresh the word lines WL_v3 and WL_v4 based on the table 1000 in the mode (mode_F). The word lines WL_v3 and WL_v4 may be adjacent word lines of a word line having a high number of accesses in the table 1000.

In embodiments, the word line WL_v3 may be an 8-th word line that is adjacent to a 9-th word line, and the word line WL_v4 may be a 10-th word line. Alternatively, the word line WL_v3 may be the 10-th word line, and the word line WL_v4 may be the 8-th word line.

In embodiments, the word line WL_v3 may be a pair of the 8-th and 10-th word lines, and the word line WL_v4 may be a pair of 49-th and 51-st word lines, which are adjacent word lines of a 50-th word line.

The self-refresh circuit 230 may reset the number of accesses of the word lines that are the basis of the refreshed word lines WL_v3 and WL_v4.

Although it has been described in FIG. 17 that word lines are refreshed one by one, embodiments are not limited thereto, and a plurality of word lines may be simultaneously refreshed.

In addition, although it has been described that the word line is refreshed in the mode (mode_N) in the period T31 and the word line is refreshed in the mode (mode_F) in the period T32, embodiments are not limited thereto, and the word line may be refreshed in the mode (mode_F) in the period T31, and the word line may be refreshed in the mode (mode_N) in the period T32.

Figure 18:
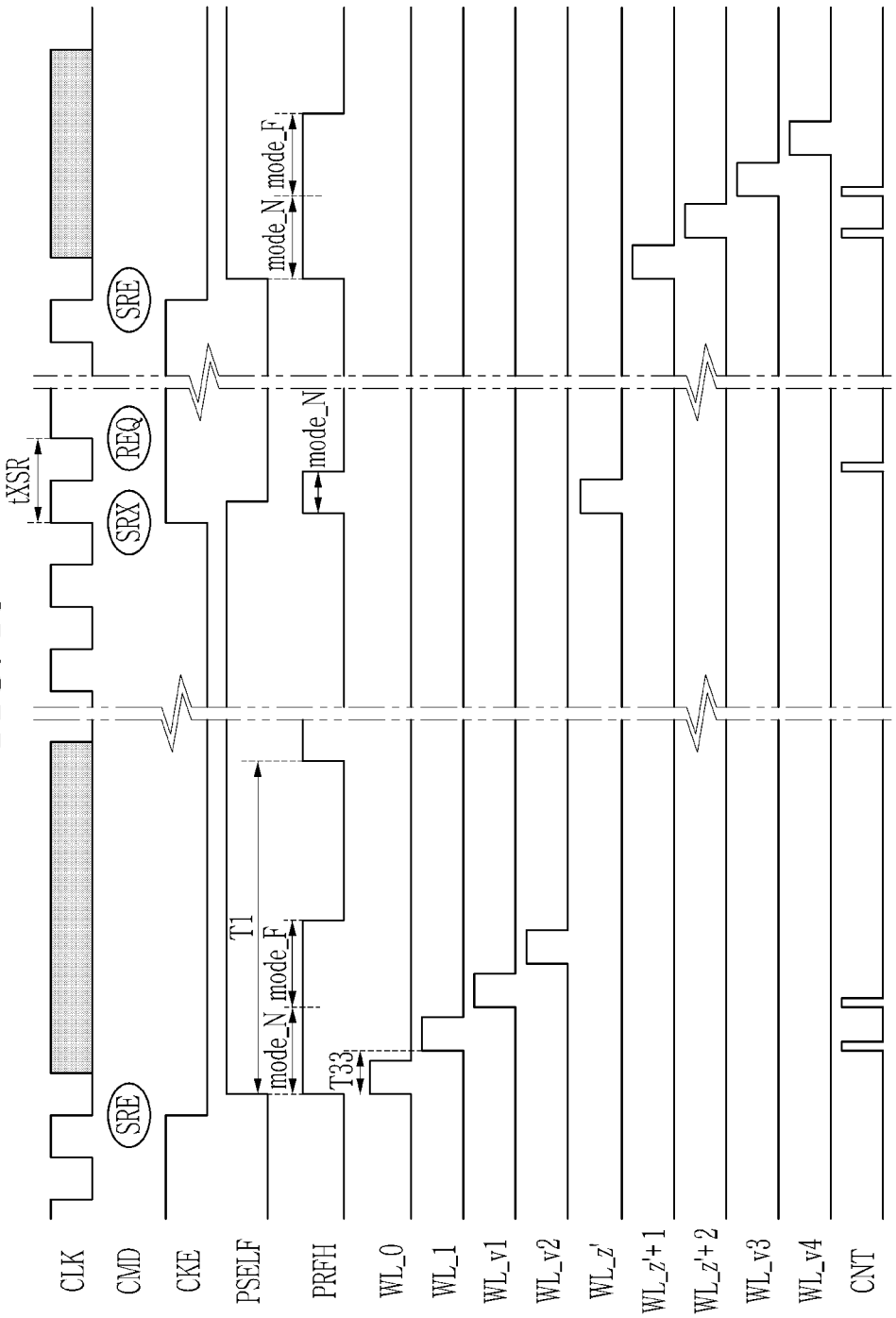
FIG. 18 illustrates a timing diagram for explaining an operation of a memory device according to an embodiment.

FIG. 18 illustrates a timing diagram for explaining an operation of a memory device according to an embodiment.

Referring to FIG. 16 and FIG. 18, timings of a clock signal CLK, a command signal CMD, a clock enable signal CKE, a self-refresh mode signal PSELF, a self-refresh control signal PRFH, a plurality of signals applied to a plurality of word lines WL_0, WL_1, WL_z' to WL_z'+2, and WL_v1 to WL_v4, and a counter control signal CNT are shown.

The contents of the clock signal CLK, the command signal CMD, the clock enable signal CKE, the self-refresh mode signal PSELF, and the self-refresh control signal PRFH described with reference to FIG. 9 and FIG. 17 may be equally applied to those of FIG. 18.

In FIG. 18, the signal generator 233 may output the counter control signal CNT when the self-refresh control signal PRFH is maintained at a high level for a period T33. That is, the signal generator 233 may output the counter control signal CNT after the refresh of the word line WL_0, and may output the counter control signal CNT after the refresh of the word line WL_1.

The memory device 200 may refresh the word lines WL_v1 and WL_v2 based on the table 1000 in the mode (mode_F). For the mode (mode_F), the contents described with reference to FIG. 17 may be applied.

When the self-refresh exit signal SRX is received and refresh is performed on the word line WL_z' based on the refresh row address REF_ADDR in the mode (mode_N), the signal generator 233 may output the counter control signal CNT, and the refresh counter 235 may perform a counting operation on the refresh row address REF_ADDR.

Thereafter, the memory device 200 may refresh the plurality of word lines WL_z'+1, WL_z'+2, WL_v3, and WL_v4 in response to the self-refresh entry signal SRE. The memory device 200 may refresh the word lines WL_z'+1 and WL_z'+2 based on the refresh row address REF_ADDR in the mode (mode_N), and may refresh the word lines WL_v3 and WL_v4 based on the table 1000 in the mode (mode_F).

Although it has been described in FIG. 18 that word lines are refreshed one by one, embodiments are not limited thereto, and a plurality of word lines may be simultaneously refreshed.

In addition, it has been described that, at the high level of the self-refresh control signal PRFH, the word line is refreshed in the mode (mode_N) and then the word line is refreshed in the mode (mode_F), but embodiments are not limited thereto, and conversely, the word line may be refreshed in the mode (mode_F) and then the word line may be refreshed in the mode (mode_N).

Figure 19:
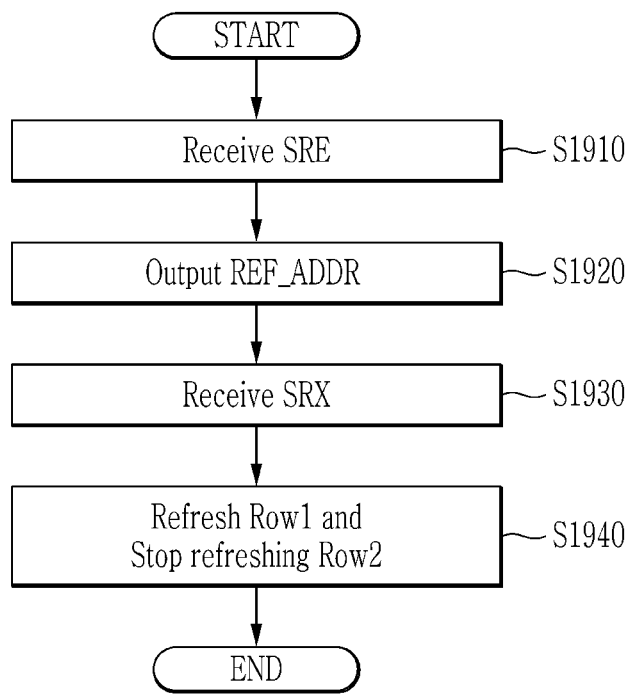
FIG. 19 illustrates a flowchart for explaining a refresh method of a memory device according to an embodiment.

FIG. 19 illustrates a flowchart for explaining a refresh method of a memory device according to an embodiment.

Referring to FIG. 19, the memory device may receive the cell refresh entry signal SRE (S1910). For example, when the clock enable signal CKE received from the memory controller transitions from the high level to the low level, and when the row address strobe signal RASB, the column address strobe signal CASB and the chip selection signal CSB are the low levels and when the write enable signal WEB is the high level, this may be an indication to the memory device to enter self-refresh.

The memory device may output the refresh row address REF_ADDR in response to the self-refresh entry signal SRE (S1920). The memory device may generate the self-refresh mode signal PSELF according to the self-refresh entry signal SRE. The memory device may generate the rising edge of the self-refresh control signal PRFH at a constant period in a period in which the self-refresh mode signal PSELF is at a high level. The memory device may output the refresh low address REF_ADDR in response to the rising edge of the self-refresh control signal PRFH. The memory device may perform a counting operation on the refresh row address REF_ADDR when the self-refresh control signal PRFH maintains a high level for a predetermined period. That is, in the case in which the refresh is interrupted due to the self-refresh exit signal SRX being received during the refresh, when the counting operation is not performed on the refresh row address REF_ADDR and the refresh is resumed, the refresh may be performed again from the corresponding row.

The memory device may receive the self-refresh exit signal SRX (S1930). For example, when the clock enable signal CKE received from the memory controller transitions from the low level to the high level, and when the chip selection signal CSB is at the high level or the chip selection signal CSB is at the low level, and when the row address strobe signal RASB, the column address strobe signal CASB, and the write enable signal WEB are at the high level, this may be an indication to the memory device to exit from the self-refresh.

The memory device may refresh up to the first row, and may stop the refresh of the second row (S1940). In this case, the first row may be a row that has already been determined to be refreshed at a time point at which the self-refresh exit signal SRX is received. For example, the memory device may determine to refresh the first row at a first time point. Although the self-refresh exit signal SRX has been received at a second time point later than the first time point, because the memory device has already determined to refresh the first row, the self-refresh control signal PRFH maintains a high level, and the memory device may refresh up to the first row and stop the refresh of the second row.

Accordingly, in the related case, when the self-refresh control signal PRFH is generated, even when the self-refresh exit signal SRX is received, it is necessary to perform refresh on a plurality of rows instead of one row, so that a waiting time is long because a time tXSR from the self-refresh exit to a valid command is long. The refresh method of the memory device according to embodiments may shorten the time tXSR from the self-refresh exit to the valid command.

Figure 20:
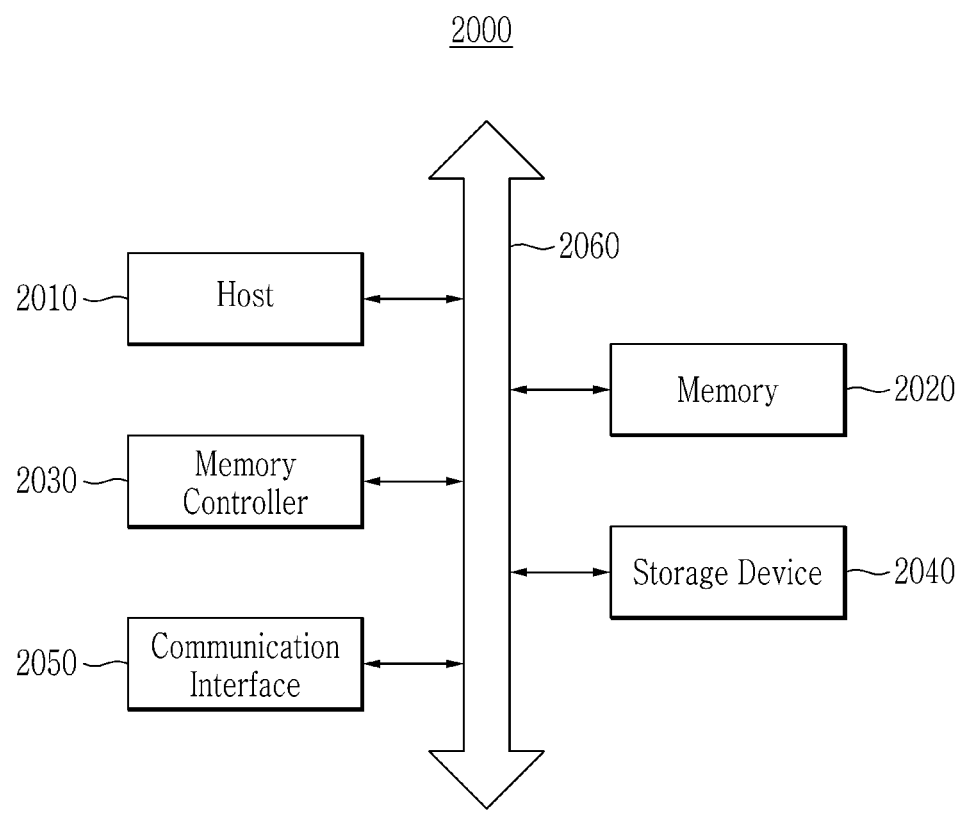
FIG. 20 illustrates a schematic block diagram of a computer system according to an embodiment.

FIG. 20 illustrates a schematic block diagram of a computer system according to an embodiment.

Referring to FIG. 20, a computing system 2000 includes a processor 2010, a memory 2020, a memory controller 2030, a storage device 2040, a communication interface 2050, and a bus 2060. The computing system 2000 may further include other general-purpose constituent elements.

The processor 2010 controls an overall operation of each constituent element of the computing system 2000. The processor 2010 may be implemented as at least one of various processing units such as a central processing unit (CPU), an application processor (AP), and a graphics processing unit (GPU).

The memory 2020 stores various data and commands. The memory 2020 may be implemented as the memory device described with reference to FIG. 1 to FIG. 19. The memory controller 2030 controls transmission of data or commands to and from the memory 2020. The memory controller 2030 may be implemented as the memory controller described with reference to FIG. 1 to FIG. 19. In some embodiments, the memory controller 2030 may be provided as a separate chip from the processor 2010. In some embodiments, the memory controller 2030 may be provided as an internal configuration of the processor 2010.

The storage device 2040 non-temporarily stores programs and data. In some embodiments, the storage device 2040 may be implemented as a non-volatile memory. The communication interface 2050 supports wired and wireless internet communication of the computing system 2000. In addition, the communication interface 2050 may support various communication methods other than internet communication. The bus 2060 provides a communication function between constituent elements of the computing system 2000. The bus 2060 may include at least one type of bus according to a communication protocol between the constituent elements.

In some embodiments, each of the components, elements, modules or units represented by a block as illustrated in FIGS. 1 to 20 may be implemented as various numbers of hardware, software and/or firmware structures that execute respective functions described above, according to embodiments. For example, at least one of these components, elements, modules or units may include various hardware components including a digital circuit, a programmable or non-programmable logic device or array, an application specific integrated circuit (ASIC), or other circuitry using use a direct circuit structure, such as a memory, a processor, a logic circuit, a look-up table, etc., that may execute the respective functions through controls of one or more microprocessors or other control apparatuses. Also, at least one of these components, elements, modules or units may include a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

Each of the embodiments provided in the above description is not excluded from being associated with one or more features of another example or another embodiment also provided herein or not provided herein but consistent with the inventive concept. For example, even if matters described in a self refresh circuit of an embodiment, are not described in a self refresh circuit of another embodiment, the matters may be understood as being related to or combinable with the different example or embodiment, unless otherwise mentioned in descriptions thereof. In addition, it should be understood that all descriptions of principles, aspects, examples, and specific embodiments of the inventive concept are intended to encompass structural and functional equivalents thereof. In addition, these equivalents should be understood as including not only currently well-known equivalents but also equivalents to be developed in the future, that is, all devices invented to perform the same functions regardless of the structures thereof.

What is claimed is:
1. A memory device comprising:
 a first memory cell array comprising a plurality of rows, the plurality of rows comprising a first row and a second row; and
 a self-refresh circuit configured to control refresh in response to a first self-refresh entry signal, and stop refresh of the second row after refreshing the first row in response to a self-refresh exit signal, wherein the self-refresh circuit is configured to output a refresh row address in a first period of a self-refresh control signal and output a row hammer address in a second period of the self-refresh control signal, and wherein the self-refresh control signal is maintained at an enable level for a period comprising the first period and the second period.

2. The memory device of claim 1, wherein the first row is a row determined to be refreshed at a time point at which the self-refresh exit signal is received.

3. The memory device of claim 1, wherein the self-refresh circuit comprises:
   a signal generator configured to output the self-refresh control signal in response to the first self-refresh entry signal; and
   a refresh counter configured to output the refresh row address indicating a row to be refreshed during an enable level period of the self-refresh control signal.

4. The memory device of claim 3, wherein the signal generator is further configured to output a counter control signal to the refresh counter based on the self-refresh control signal being at an enable level for a predetermined period, and
   wherein the refresh counter is further configured to increment the refresh row address in response to the counter control signal.

5. The memory device of claim 3, wherein, based on the self-refresh control signal being at an enable level for a predetermined period, the refresh row address indicates a predetermined number of rows.

6. The memory device of claim 5, wherein the refresh counter comprises:
   a main counter configured to increment first bits in a first area of the refresh row address in response to a counter control signal; and
   a sub-counter configured to increment r bits in a second area of the refresh row address in response to a sub-counter control signal,
   wherein the second area is configured of r bits,
   wherein the first area is configured of 2r bits, and
   wherein the sub-counter control signal is inputted 2r times.

7. The memory device of claim 5, wherein the refresh counter is configured to output the refresh row address to sequentially refresh the predetermined number of rows based on the self-refresh control signal being at an enable level for the predetermined period.

8. The memory device of claim 5, wherein the refresh counter is configured to output the refresh row address to simultaneously refresh the predetermined number of rows based on the self-refresh control signal being at an enable level for the predetermined period.

9. The memory device of claim 3,
   wherein the row hammer address is an address of a row adjacent to a row having a largest number of accesses.

10. The memory device of claim 9, wherein the self-refresh circuit is configured to reset a number of accesses of the row having the largest number of accesses, after outputting the row hammer address.

11. The memory device of claim 9, wherein the first period temporally precedes the second period.

12. The memory device of claim 9, wherein the second period temporally precedes the first period.

13. The memory device of claim 1, further comprising a second memory cell array,
   wherein the self-refresh circuit comprises:
   a signal generator configured to output a the self-refresh control signal comprising a first enable level period and a second enable level period in response to the first self-refresh entry signal;
   a first refresh counter configured to output a first refresh row address indicating a row to be refreshed in the first memory cell array in the first enable level period; and
   a second refresh counter configured to output a second refresh row address indicating a row to be refreshed in the second memory cell array in the second enable level period.

14. The memory device of claim 1, further comprising a second memory cell array, a third memory cell array, and a fourth memory cell array,
   wherein the self-refresh circuit comprises:
   a signal generator configured to output the self-refresh control signal comprising a first enable level period and a second enable level period in response to the first self-refresh entry signal;
   a first refresh counter configured to output a first refresh row address indicating a row to be refreshed in the first memory cell array and a row to be refreshed in the second memory cell array in the first enable level period; and
   a second refresh counter configured to output a second refresh row address indicating a row to be refreshed in the third memory cell array and a row to be refreshed in the fourth memory cell array in the second enable level period.

15. The memory device of claim 1, wherein the self-refresh circuit is configured to control the refresh to be refreshed from the first row in response to a second self-refresh entry signal received after the self-refresh exit signal.

16. The memory device of claim 1, wherein the self-refresh circuit is configured to control the refresh to be refreshed from the second row in response to a second self-refresh entry signal received after the self-refresh exit signal.

17. A memory device comprising:
   a command decode circuit configured to decode a command, and output a self-refresh entry signal and a self-refresh exit signal;
   a self-refresh circuit configured to output a self-refresh control signal and a refresh row address in response to the self-refresh entry signal, and stop output of the self-refresh control signal and the refresh row address in response to the self-refresh exit signal; and
   a row address multiplexer configured to output the refresh row address in response to a high level of the self-refresh control signal, and output an operation row address in response to a low level of the self-refresh control signal,
   wherein the self-refresh circuit is configured to output the refresh row address as the refresh row address in a first period of the self-refresh control signal and output a row hammer address as the refresh row address in a second period of the self-refresh control signal,
   wherein the self-refresh control signal is maintained at an enable level for a period comprising the first period and the second period,
   wherein the refresh row address indicates a row to be refreshed, and
   wherein the operation row address indicates a row to be written to, read from, or erased.

18. The memory device of claim 17, wherein the self-refresh circuit is configured to increment the refresh row address based on the self-refresh control signal being at a high level for a predetermined period.

19. The memory device of claim 17, wherein the row hammer address indicates a row adjacent to a row having a largest number of accesses.

* * * * *